US010824433B2

(12) United States Patent
Sodani et al.

(10) Patent No.: US 10,824,433 B2
(45) Date of Patent: *Nov. 3, 2020

(54) ARRAY-BASED INFERENCE ENGINE FOR MACHINE LEARNING

(71) Applicant: Cavium, LLC, Santa Clara, CA (US)

(72) Inventors: Avinash Sodani, San Jose, CA (US); Ulf Hanebutte, Gig Harbor, WA (US); Senad Durakovic, Palo Alto, CA (US); Hamid Reza Ghasemi, Sunnyvale, CA (US); Chia-Hsin Chen, Santa Clara, CA (US)

(73) Assignee: Marvell Asia Pte, Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/226,539

(22) Filed: Dec. 19, 2018

(65) Prior Publication Data
US 2019/0243800 A1  Aug. 8, 2019

Related U.S. Application Data

(60) Provisional application No. 62/628,130, filed on Feb. 8, 2018, provisional application No. 62/644,352, filed
(Continued)

(51) Int. Cl.
*G06F 9/302* (2018.01)
*G06F 15/76* (2006.01)
(Continued)

(52) U.S. Cl.
CPC .......... *G06F 9/3877* (2013.01); *G06F 9/3836* (2013.01); *G06F 9/3851* (2013.01);
(Continued)

(58) Field of Classification Search
CPC .... G06F 9/3836; G06F 9/3802; G06F 9/3851; G06F 9/544; G06F 12/063;
(Continued)

(56) References Cited

U.S. PATENT DOCUMENTS 7,539,717 B2    5/2009  Hussain
8,117,137 B2 *  2/2012  Xu .................. G06F 16/334
                                                         706/12
(Continued)

OTHER PUBLICATIONS

"Artificial Intelligence (AI) vs. Machine Learning vs. Deep Learning" pp. 1-8, PATHMIND https://pathmind.com/wiki/ai-vs-machine-learning-vs-deep-learning (Year: 2019).*
(Continued)

*Primary Examiner* — Daniel H Pan

(57) ABSTRACT

An array-based inference engine includes a plurality of processing tiles arranged in a two-dimensional array of a plurality of rows and a plurality of columns. Each processing tile comprises at least one or more of an on-chip memory (OCM) configured to load and maintain data from the input data stream for local access by components in the processing tile and further configured to maintain and output result of the ML operation performed by the processing tile as an output data stream. The array includes a first processing unit (POD) configured to perform a dense and/or regular computation task of the ML operation on the data in the OCM. The array also includes a second processing unit/element (PE) configured to perform a sparse and/or irregular computation task of the ML operation on the data in the OCM and/or from the POD.

19 Claims, 11 Drawing Sheets

US 10,824,433 B2
Page 2

Related U.S. Application Data on Mar. 16, 2018, provisional application No. 62/675,076, filed on May 22, 2018.

(51) Int. Cl.

| | |
|---|---|
| *G06N 5/04* | (2006.01) |
| *G06N 99/00* | (2019.01) |
| *G06F 9/38* | (2018.01) |
| *G06N 20/00* | (2019.01) |
| *G06N 20/10* | (2019.01) |
| *G06F 17/16* | (2006.01) |
| *G06F 15/78* | (2006.01) |
| *G06N 20/20* | (2019.01) |
| *G06F 15/80* | (2006.01) |
| *G06F 9/30* | (2018.01) |

(52) U.S. Cl.
CPC .......... *G06F 15/7807* (2013.01); *G06F 17/16* (2013.01); *G06N 20/00* (2019.01); *G06N 20/10* (2019.01); *G06F 9/3001* (2013.01); *G06F 15/7864* (2013.01); *G06F 15/8023* (2013.01); *G06F 2212/602* (2013.01); *G06N 5/04* (2013.01); *G06N 20/20* (2019.01)

(58) Field of Classification Search
CPC ............. G06F 12/0862; G06F 15/7807; G06F 15/7839; G06F 15/7864; G06F 15/8023; G06F 17/16; G06F 2212/602; G06F 9/3001; G06N 20/00; G06N 20/10; G06N 20/20; G06N 3/063; G06N 5/04
USPC ....... 712/10, 11, 16–19, 22, 221; 706/12, 27
See application file for complete search history.

(56) References Cited

U.S. PATENT DOCUMENTS

| | | | |
|---|---|---|---|
| 8,175,981 B2 * | 5/2012 | Hawkins | ............... G06N 7/005 |
| | | | 706/12 |
| 9,645,974 B1 | 5/2017 | Patil et al. | |
| 9,753,695 B2 | 9/2017 | Mortensen et al. | |
| 10,186,011 B2 | 1/2019 | Nurvitadhi et al. | |
| 10,261,786 B2 | 4/2019 | Lacy et al. | |
| 10,558,599 B2 | 2/2020 | Staudenmaier et al. | |
| 10,614,357 B2 | 4/2020 | Lie et al. | |
| 2002/0023118 A1 | 2/2002 | Peled et al. | |
| 2003/0204674 A1 | 10/2003 | Ryan et al. | |
| 2009/0319996 A1 | 12/2009 | Shafi | |
| 2014/0108734 A1 | 4/2014 | Kitchin et al. | |
| 2014/0365548 A1 * | 12/2014 | Mortensen | ............ G06F 9/3001 |
| | | | 708/523 |
| 2016/0124651 A1 | 5/2016 | Sankaranarayanan et al. | |
| 2017/0316312 A1 * | 11/2017 | Goyal | ..................... G06F 17/16 |
| 2017/0323224 A1 * | 11/2017 | Bruestle | ................. G06N 20/00 |
| 2018/0137668 A1 | 5/2018 | Mercati et al. | |
| 2018/0167083 A1 | 6/2018 | Dubey et al. | |
| 2018/0189675 A1 | 7/2018 | Nurvitadhi et al. | |
| 2018/0296281 A1 | 10/2018 | Yeung et al. | |
| 2018/0314941 A1 * | 11/2018 | Lie | ........................... G06N 3/08 |
| 2019/0012295 A1 | 1/2019 | Yinger et al. | |
| 2019/0205741 A1 | 7/2019 | Gupta et al. | |
| 2019/0243800 A1 | 8/2019 | Sodani | |
| 2019/0266479 A1 | 8/2019 | Singh et al. | |
| 2019/0392297 A1 | 12/2019 | Lau et al. | |

OTHER PUBLICATIONS

U.S. Appl No. 16/420,078 (Year: 2019).*
U.S. Appl. No. 16/420,092 (Year: 2019).*
U.S. Appl. No. 16/420,055 (Year: 2019).*

* cited by examiner

ARRAY-BASED INFERENCE ENGINE FOR MACHINE LEARNING

CROSS-REFERENCE TO RELATED APPLICATIONS

This application claims the benefit of U.S. Provisional Patent Application No. 62/628,130, filed Feb. 8, 2018, and entitled "MACHINE LEARNING SYSTEM," which is incorporated herein in its entirety by reference.

This application claims the benefit of U.S. Provisional Patent Application No. 62/644,352, filed Mar. 16, 2018, and entitled "PROGRAMMING HARDWARE ARCHITECTURE FOR MACHINE LEARNING VIA INSTRUCTION STREAMING," which is incorporated herein in its entirety by reference.

This application claims the benefit of U.S. Provisional Patent Application No. 62/675,076, filed May 22, 2018, which is incorporated herein in its entirety by reference.

BACKGROUND

Applied Machine Learning (ML) is a booming field that utilizes a cascade of layers of nonlinear processing units and algorithms for feature extraction and transformation with a wide variety of usages and applications. Machine learning typically involves two phases, training, which uses a rich set of training data to train a plurality of machine learning models, and inference, which applies the trained machine learning models to actual applications. Each of the two phases poses a distinct set of requirements for its underlying infrastructures. Various infrastructures may be used, e.g., graphics processing unit (GPU), a central processing unit (CPU), a Field Programmable Gate Array (FPGA), an Application Specific Integrated Circuit (ASIC), etc.

Specifically, the training phase focuses on, as a non-limiting example, GPU or ASIC infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (e.g., return on investment) efficiency.

ML is usually very computationally and data intensive. Unfortunately, as the input data and model sizes grow, data movement becomes a bottleneck and data processing increases because in order to perform simple processing, three operations or instructions are performed for each data, e.g., load, processing, and store. As the amount of data grows, performing these three operations or instructions becomes burdensome. Moreover, the current computing architecture is not scalable and are not well suited for ML and its applications, since a lot of time goes in loading and storing the data in comparison to processing the data. For non-limiting examples, although a CPU is flexible and may be used for ML, it has low performance efficiencies in ML applications because of it performs loads and stores in a manner that is flexible and applicable to all forms of software. This flexibility causes it to perform extra work in hardware, which reduces its efficiency. Although a graphics Pipeline Unit (GPU) may have a higher performance than a CPU, it is burdened with additional overhead, e.g., Graphics Effects (Gfx), High Performance Computing (HPC), etc. that are not used in ML applications. A Field Programmable Gate Array (FPGA) also has significant overhead, since it needs to support burning in any form of logic or algorithm into the programmable gate arrays. This reduces hardware efficiency for Machine Learning algorithms where the logic that needs to be implemented is a much smaller subset of all forms of logic or algorithm. Moreover, FPGA is low on programmability, since the constraints of fitting a logic or algorithm into available gate capacity of an FPGA (which can vary for different FPGAs) places limits on size, type and scope of the algorithms that can be mapped into FPGA. An Application Specific Integrated Circuit (ASIC) may be efficient, but it is not flexible to adapt to the changing algorithms and environment required for ML applications. A need has arisen for a new hardware architecture that is highly efficient, with reduced overhead, while flexible and adaptable to the changing environment and algorithms of ML applications. Moreover, a need has arisen for a new instruction set architecture to reduce the number of instructions required to perform certain tasks, e.g., processing, moving data, loading data, etc.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
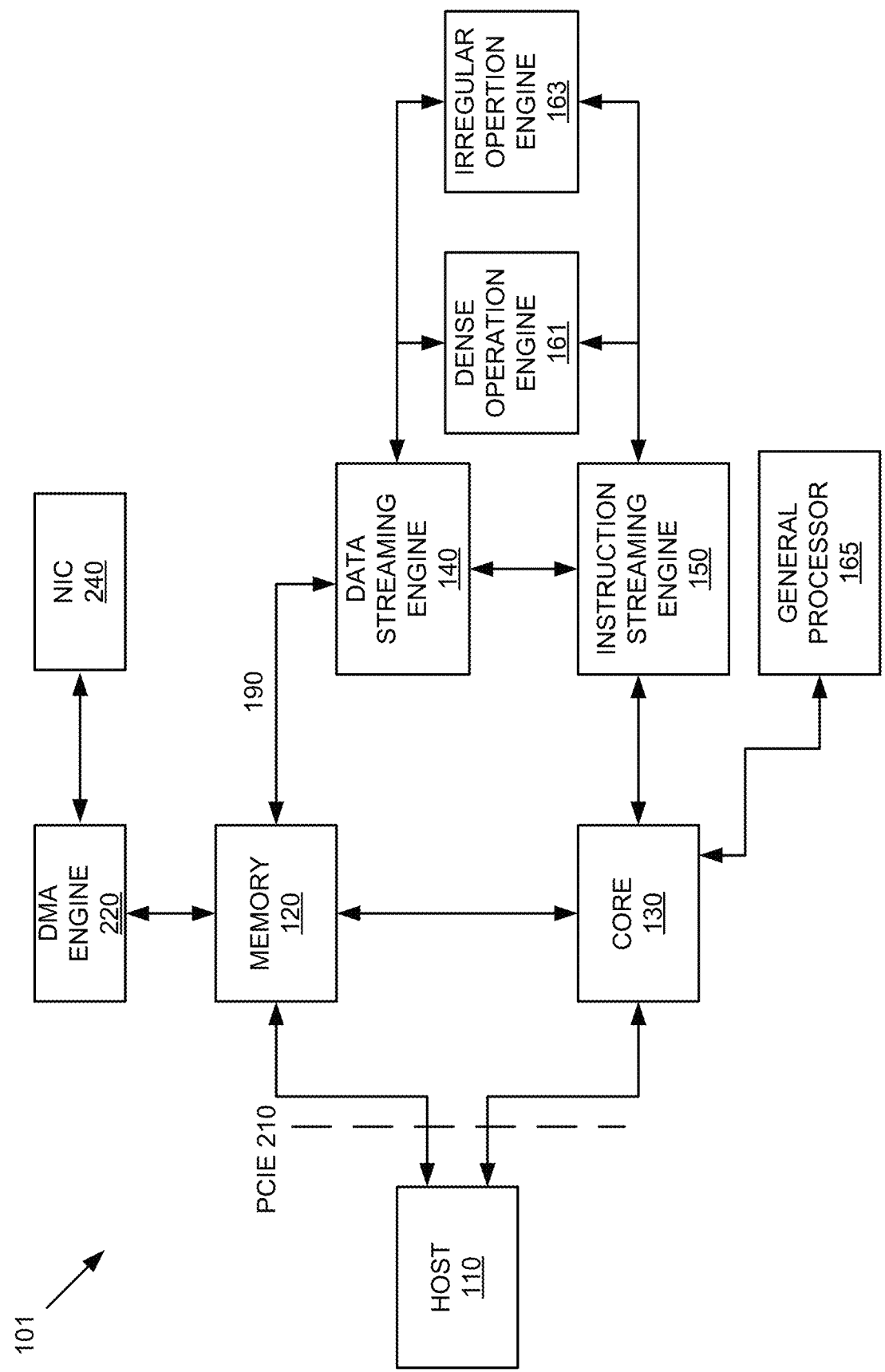
FIG. 1A-1B depict examples of diagrams of a hardware-based programmable architecture 100 configured to support machine learning according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new programmable hardware architecture for ML is proposed, which includes at least a host, a memory, a core, a data streaming engine, an instruction-streaming engine, and an interference engine. The core is configured to interpret a plurality of ML commands/instructions for a ML operation and/or data received from the host and coordinate activities of the streaming and the inference engines based on the data in the received ML commands. The inference engine may include a dense operation engine and an irregular operation engine. The dense operation engine is an engine that is optimized to efficiently process dense data with regular operations, e.g., matrix operations such as multiplication, matrix manipulation, tanh, sigmod, etc. On the other hand the irregular operation engine is an engine that is optimized to efficiently process sporadic data with irregular operations, e.g., memory transpose, addition operation, operations on irregular data structures (such as trees, graphs, and priority queues). According to some embodiments, the core may coordinate some of the instructions received from the host to be processed. In some embodiments, the core may be a general processor, e.g., a CPU, etc.

Specifically, the core is configured to divide the plurality of ML commands between the core and the inference engine for efficient execution thereof. The ML commands and relevant data thereof to be executed by the inference engine are transmitted from the core and the memory to the instruction-streaming engine and the data streaming engine for efficient streaming to the inference engine. The data and instruction steaming engines are configured to send one or more data streams and ML commands to the inference engine in response to the received programming instructions from the core. It is appreciated that, in some embodiments, the ML commands being transmitted from the core to the data/instruction-streaming engines is in a function call format, therefore enabling different processors with different instruction set architectures to be programmed using one type of instruction set architecture. To the core, the operation being performed is a write operation into a memory component, but in reality the operation being done is passing on specific instructions along with their associated data via a function call to the streaming engines for transmission to the inference engine where they can be executed. The inference engine is configured to process the instruction/data streams received from the data/instruction stream engines for the ML operation according to the programming instructions received from the instruction/data streaming engines.

The proposed ML hardware architecture is highly efficient, flexible and optimized for high-efficiency ML computing while programmable to adapt to the changing environment, usage, applications and algorithms for ML with reduced overhead. By providing hardware support to streamline data/instruction flow, the proposed ML hardware architecture improves system-level performance by significantly reducing the hardware overhead involved in moving data and/or instruction in existing computing architectures. Moreover, the programming instruction set reduces the number of instructions required to perform certain tasks, e.g., processing, moving data, loading data, etc. The proposed ML hardware architecture works well with existing software frameworks and code and may be applied to a wide variety of ML algorithms and neural networks including but not limited to convolution neural network (CNN), recurrent neural network (RNN), gradient boosting machine (GBM), generative adversarial neural network, decision trees, random forest, support vector machine (SVM), clustering, Markov random field (MRF), etc.

FIG. 1A depicts an example of a diagram of a hardware-based programmable system/architecture 101 configured to support machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1A, the architecture 101 may include a host 110 coupled to a memory (e.g., DDR) 120 and a core engine 130. The memory 120 may be coupled to a data streaming engine 140. The core 130 is coupled to an instruction-streaming engine 150, which is coupled to the data streaming engine 140. The core 130 is also coupled to a general processor 165. In some embodiments, the general processor 165 can be part of the core 130. The instruction-streaming engine 150 and the data streaming engine 140 are coupled to the dense operation engine 161 and irregular operation engine 163. In some embodiments, the dense operation engine 161 and the irregular operation engine 163 are part of an inference engine 160 discussed below. Each of the engines in the architecture 101 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 100 is on a single chip, e.g., a system-on-chip (SOC).

The dense operation engine 161 is an engine that is optimized to efficiently process dense data with regular operations, e.g., matrix operations such as multiplication, matrix manipulation, tanh, sigmod, etc. On the other hand the irregular operation engine 163 is an engine that is optimized to efficiently process sporadic data with irregular operations, e.g., memory transpose, addition operation, operations on irregular data structures (such as trees, graphs, and priority queues). According to some embodiments, the core may coordinate some of the instructions received from the host to be processed by the general processor 165, e.g., a CPU, etc.

Figure 1B:
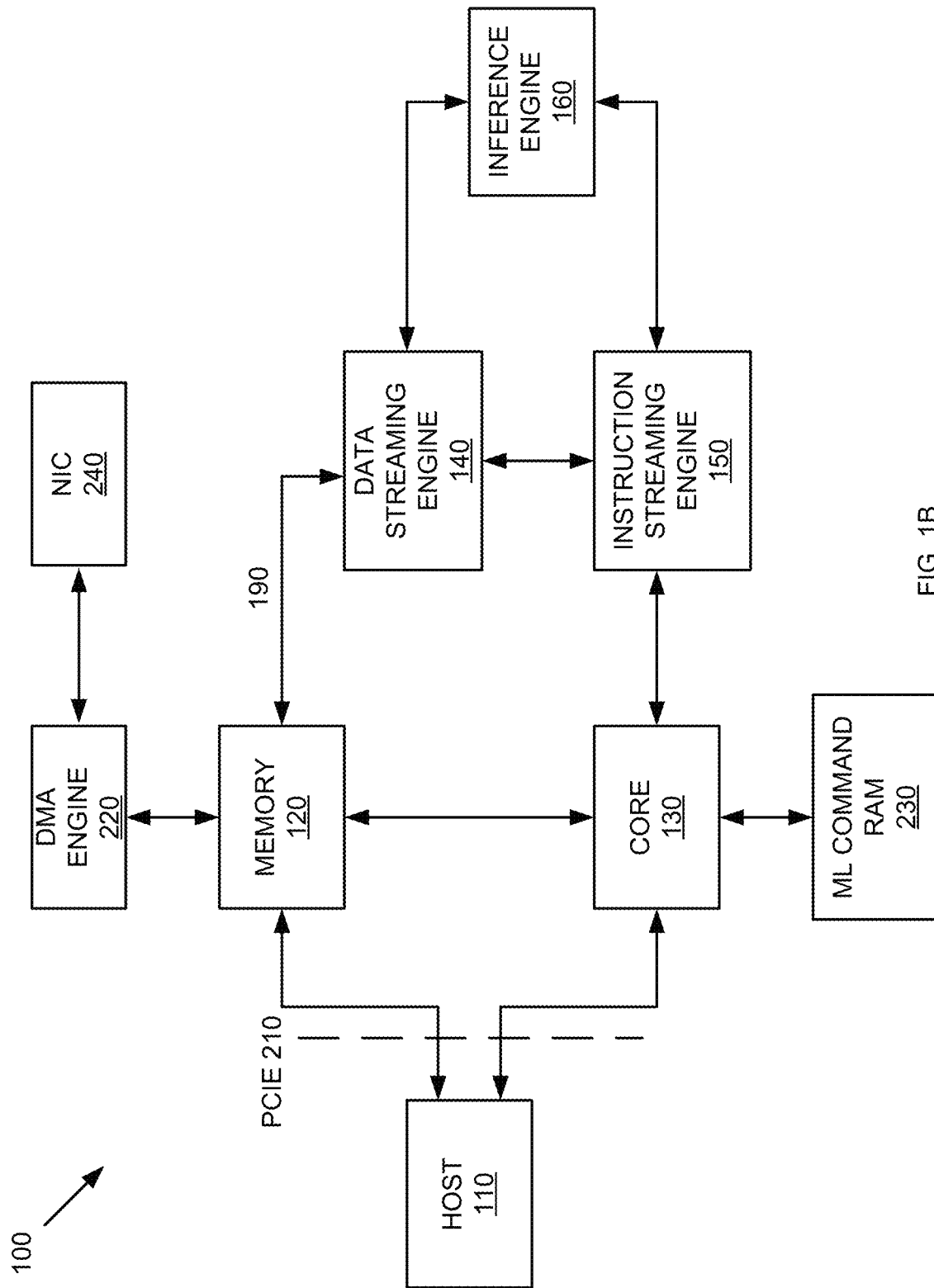

FIG. 1B depicts an example of a diagram of a hardware-based programmable system/architecture 100 configured to support machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1B, the architecture 100 may include a host 110 coupled to a memory (e.g., DDR) 120 and a core engine 130. The memory 120 may be coupled to a data streaming engine 140. The core 130 is coupled to an instruction-streaming engine 150, which is coupled to the data streaming engine 140. The instruction-streaming engine 150 and the data streaming engine 140 are coupled to the inference engine 160. Each of the engines in the architecture 100 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 100 is on a single chip, e.g., a system-on-chip (SOC).

In the example of FIG. 1B, the host 110 is a processing unit configured to receive or generate data to be analyzed and/or inferred via machine learning. For a non-limiting example, the host 110 is configured to receive an image, wherein the subject of the image, e.g., a house, a dog, a cat, etc., is to be identified by the ML operation through inference. It is appreciated that while the embodiments are described with respect to identifying the subject matter in the image, the embodiments are not limited thereto and the data received by the host 110 can be of any type. In some embodiments, the host 110 may also include and provide training data that may be used by the inference engine 160 for the ML operation to identify the subject in the image, wherein the training data may optionally include a polynomial with their respective weights. In some embodiments, the inference engine 160 includes the dense operation engine 161 and irregular operation engine 163 depicted in FIG. 1A and discussed above. In some embodiments, the host 110 is configured to transmit and save the data to be inferred and/or the training data to the memory 120. In some embodiments, the host 110 is configured to provide a plurality of commands to the core 130 to coordinate various components in the architecture 100 to perform a ML operation on the data. For a non-limiting example, the memory 120 may receive the data to be inferred and/or the training data from a networking component, e.g., network interface card (NIC) 240, via a direct memory access engine (DMA) 220 per a load command from the host 110. In some embodiments, the host 110 is configured to communicate with the memory 120 and the core 130 via a PCIe interface/controller 210.

In the example of FIG. 1B, the core 130 is a processing engine coupled to the host 110 and configured to receive and interpret a plurality of ML commands for a ML operation from the host 110. In some embodiments, the core 130 is configured to save the plurality of ML commands in a ML command RAM 230. It is appreciated that the ML commands may be stored in the memory 120 instead of using ML command RAM 230. In some embodiments, the ML instruction RAM 230 may be integrated with the NIC 240 thereby reducing extra hops and accelerating access to the memory 120 and/or the ML instruction RAM 230. Once the ML commands have been interpreted, the core 130 is configured to coordinate activities of other components on the architecture 100, e.g., the data streaming engine 140, the instruction-streaming engine 150, the inference engine 160, according to the received ML commands. In some embodiments, the core 130 is an FPGA, a CPU, or a microcontroller.

In some embodiments, the core 130 is configured to execute any software code written through a common high-level language. The core 130 is configured to process a plurality of performance non-critical operations, e.g., data/instruction preparatory work, data collection, data mapping, etc. In some embodiments, the core 130 may also be configured to breakdown the received ML commands into performance critical and noncritical operations/tasks such that the performance noncritical operations can be processed by the core 130 and the performance critical operations (e.g., matrix multiplication) can be processed by the inference engine 160. In other words, the core 130 is configured to divide the plurality of ML commands between the core 130 and the inference engine 160 for efficient execution thereof. In some embodiments, the core 130 may also be configured to assign/divide the plurality of ML commands (also referred to as tasks or sub-tasks) to various components, e.g., the inference engine 160, for processing. In some embodiments, the core 130 is configured to allocate one or more locations in the memory 120 for storing of tasks/commands, the data, result after the data is processed, etc. to be accessed and used by the core 130 or other components, e.g., inference engine 160, in the architecture 100. As such, the core 130 and the inference engine 160 are configured to execute the entire ML algorithms and the operation by themselves instead of having to rely on or require the host 110 to execute certain ML commands or operations. By supporting and executing the entire ML operation on the programmable hardware architecture 100, the core 130 eliminates performance overhead of transferring data to the host 110 and back to execute any non-supported ML operations and reduces burden on the host 110 to achieve a higher performance.

The ML commands and relevant data thereof to be executed by the inference engine 160 is transmitted from the core 130 and the memory 120 to the instruction-streaming engine 150 and the data streaming engine 140 for efficient streaming to the inference engine 160. The data/instruction steaming engines 140-150 are configured to send one or more data streams and programming instructions to the inference engine 160 in response to the received ML commands from the core 130. In some embodiments, the core 130 is configured to execute one or more library function calls. For a non-limiting example, a library function call used by the core 130 may be a load command having various parameters, wherein the core 130 may pass certain parameters to the instruction-streaming engine 150 via the library function call. Passing of instructions and their associated data from the core 130 and the memory 120 to the inference engine 160 via a function call enables different processors with different instruction set architectures to be programmed using a single type of instruction set architecture. In other words, for core 130 the operation being performed is a write operation into a special memory location, i.e. instruction-streaming engine 150, but in reality the operation being done is passing on specific instructions along with their associated data to the streaming engines 140-150, via a function call, for transmission to the inference engine 160 where they can be executed and processed. Accordingly, the function call provides a mechanism to seamlessly merge more than one instruction set architecture using a single instruction set architecture by encapsulating the instruction within the function call and providing the instruction as data to the special memory location, i.e. instruction-streaming engine 150, inference engine 160, etc. where it can be processed. The inference engine 160 is configured to process the data/instruction streams received from the data/instruction stream engines 140-150 for the ML operation according to the programming instructions received.

In some embodiments, the instruction-streaming engine 150 is configured to use the parameters provided by the core 130, via a function call, to stream the ML commands in a specific instruction set architecture format of the inference engine 160 to the inference engine 160. Similarly, the data streaming engine 140 is configured to fetch the data stored in the memory 120 based on the parameters provided by the core 130, via a function call, to stream the data in a specific instruction set architecture format of the inference engine 160 to the inference engine 160. It is appreciated that the ML commands in the specific instruction set architecture format and the data are streamed in such a way to reduce the number of required operations. For a non-limiting example, a conventional CPU may require a load, process, and store in order to move one piece of data from one location to the next, however, in some embodiments a streaming mechanism may be used such that data and/or instructions are streamed in a continuous fashion without a need to execute three instructions for each piece of data. For a non-limiting example, the received parameters may be used by the instruction-streaming engine 150 to configure the data streaming engine 140 to achieve the streaming load instruction as described in FIG. 2 above. For another non-limiting example, the instruction-streaming engine 150 may configure the inference engine 160 to process data in a highly specific and efficient manner based on the received parameters. Specifically, the instruction-streaming engine 150 may configure one or more processing elements within the inference engine 160 to process the stream of data in a specific manner. In some embodiments, the instruction-streaming engine 150 may also configure on-chip memory on the inference engine 160 to receive data in a specific manner (e.g., streaming fashion) from the data streaming engine 140 as described below.

Figure 4:
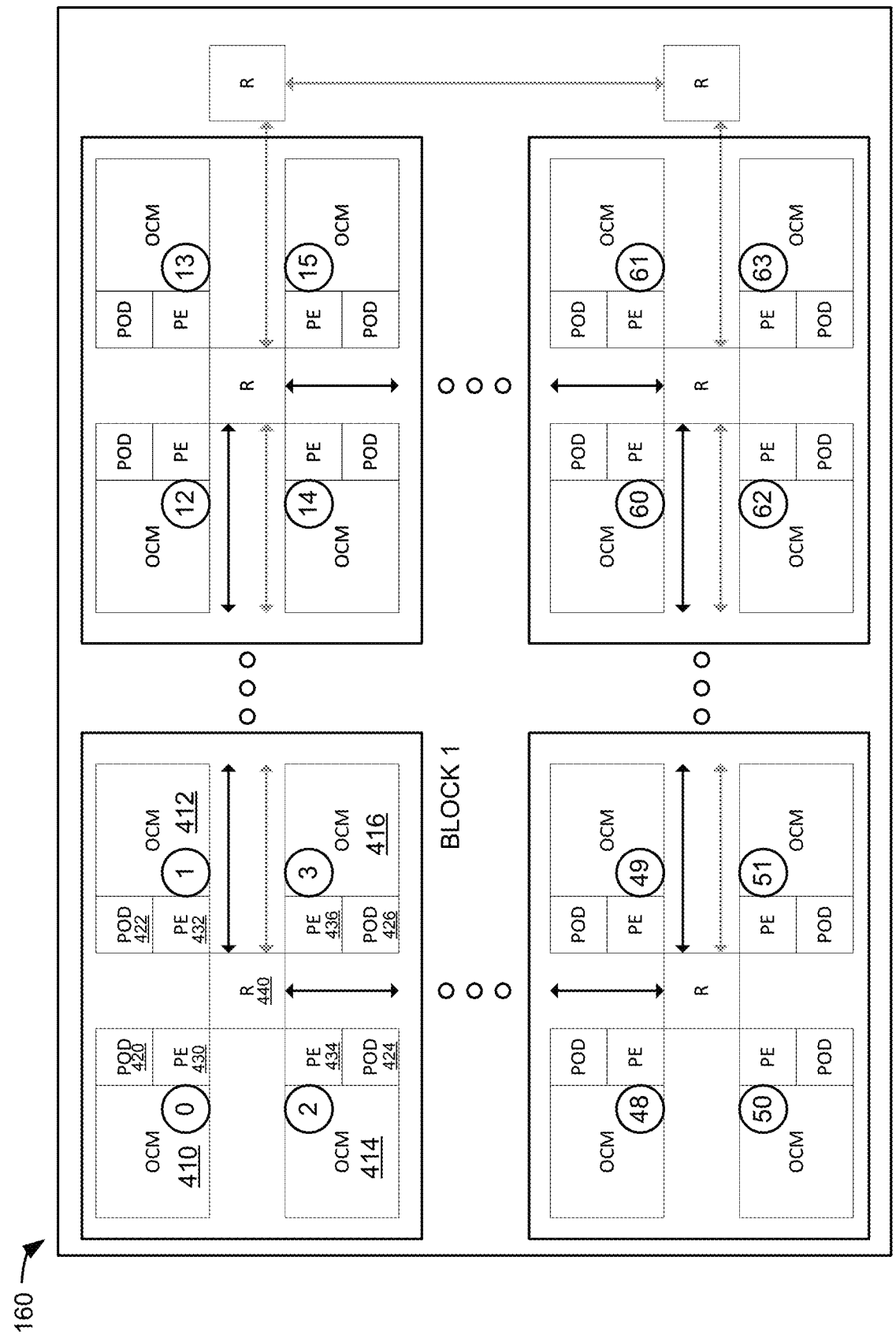
FIG. 4 depicts a diagram of an example of the architecture of the inference engine according to one aspect of the present embodiments.

In some embodiments, the core 130 is configured to break down a top-level task, e.g., a ML operation, specified by the command from the host 110 into a plurality of sub-tasks and instruct or program other components/blocks on the architecture 100, e.g., the data streaming engine 140, the instruction-streaming engine 150, the inference engine 160, to execute those sub-tasks in a coordinated fashion. In some embodiments, the core 130 processes performance non-critical operations. Other instructions that are performance critical operations are passed in a function call from the core 130 to the data streaming engine 140 and/or the instruction-streaming engine 150. Programmer having knowledge of the inference engine 160 architecture, can pass the performance critical operations to the inference engine 160. The sub-tasks and their associated data may therefore be streamed, using the instruction-streaming engine 150 and the data streaming engine 140, to the inference engine 160, thereby programming the inference engine 160, as desired. It is appreciated that two exemplary embodiments of the inference engine 160 architectures are shown in FIGS. 4 and 5. In some embodiments, dense and more regular operations, e.g., matrix operations such as multiplication, matrix manipulation, tanh, sigmod, etc., may be programmed in a first type of processing unit of the inference engine 160 while irregular operations, e.g., memory transpose, addition operation, operations on irregular data structures (such as trees, graphs, and priority queues), etc., may be programmed in a second type of processing unit of the inference engine 160. Hybrid approaches may also be programmed in various types of processing units.

Once programmed, these components/blocks within the inference engine 160 are responsible for executing the sub-tasks and thus save considerable amount of time and load from the host 110. It is appreciated that, once the command is broken down to the sub-tasks, certain sub-tasks are being executed by the core 130 itself but commands for other sub-tasks that are highly specialized and require high performance efficiency are transmitted to the instruction-streaming engine 150, in a function call. In some embodiments, commands for other sub-tasks that are highly specialized may have a different instruction set architecture and appear to the core 130 as data being written to a special memory location but in reality the special memory component is the instruction-streaming engine 150. The instruction-streaming engine 150 may use the instructions received with the different instruction set architecture with, for non-limiting examples, one or more of different addressing modes, different instructions, different native data types, different registers, different memory architecture, different interrupts, etc., to stream the sub-tasks and any data associated therewith to the inference engine 160 for execution and further processing. It is further appreciated that the core 130 may generate certain sub-tasks that occur at a frequency less than every cycle for certain components of the architecture 00, thereby allowing such components to run at a lower frequency than the rest of the architecture 100, if needed. In some embodiments, any sub-task or programming instructions that are infrequent is executed by the core 130 while repetitive and more frequent programming instructions are executed by a dedicated component of the architecture 100, e.g., inference engine 160. The following is an exemplary software code where every sub-task prior to the "LoadAregfromMainMem" is executed by the core 130 and everything after is executed by the inference engine 160.

```
uint8 weightMat[96] [384];
uint weight_r = 96, weight_c = actT_c = 384;
uint9 *actMatT_ptr[64]; //pointers to transposed activation matrix per OCM POD
uint actT_r[64] = [55×7, 55×7, 55×7, 55×7, 55×7, 55×8, 55×7, 55×5, ... 8 times]
uint9 *bias_ptr[64]; //pointer to bias array in each OCM POD
uint9 *resultMatT_ptr[64]; //pointers to transposed result matrix per OCM POD
MatrixMultiplyAddBias (weightMat, weight_r, weight_c, actMatT_ptr,
actT_r, actT_c, bias_ptr, resultMatT_ptr, doRelu, doTanhSigmoid)
{
```

```
        int mat1_blk_r = 8, linelen = 64, mat2T_blk_r = 32;
        int num_blks = weight_c/linelen // # blks of columns = 384/64 =
6
        /* converting global address pointer to local OCM pointer by
removing the
        higher bits specifying the POD */
        uint9 * actMatTpod_p = (*actMatT_ptr) [0] & 0x3ffff;
        uint9 * biaspod_p = (*bias_ptr) [0] & 0x3ffff;
        uint9 * resMatTpod_p = (*resultMatT_ptr) [0] & 0x3ffff;
        Create_PODgroups_and_PODmask_with_same_number_of_rows(actT_r);
            /* Generates num_groups
                        groups_blks[ ] — # of 32 row blocks per POD in
each group
                        group_remainder[ ] — remainder rows per POD in
each group
                        grouppodmask[ ] — mask identifying PODs in
each group
                        MaxBlks — Max number of blocks among all
groups
            */
        for (int i = 0; 1 < weight_r; i += mat1_blk_r {
            /* loading 8×384 weights in blocks of 8×64 */
            LoadAregfromMainMem weightMat[i], /* weight matrix
address*/
                                linelen, /* size of each line in blk
*/
                                weight_c, /* stride between lines */
                                mat1_blk_r, /*num of lines in blk */
                                linelen, /* stride between blks*/
                                num_blks /*num_blks=384/64=6*/
            PodTaskBcst PODall, 1
                LoadBias biaspod_p[i], mat1_blk_r //Load bias for
mat1_blk_x=8
                                            chnls in each
POD
```

Figure 2:
FIG. 2 depicts an example of memory layout for streaming load instruction for a data stream according to one aspect of the present embodiments.

Traditionally, one load instruction is typically needed to load each chunk of data from a memory. In the example of FIG. 1B, the memory 120 is configured to maintain and provide the data to be inferred and/or the training data to the data streaming engine 140, which is configured to load the data onto on-chip memory (OCM) of the inference engine 160 in a streaming fashion via a single instruction, thereby reducing the number of instructions needed to load the data. Specifically, the data streaming engine 140 is configured to apply one (instead of multiple) load instruction to load a data stream 190 received from the memory 120 by specifying the manner in which the data is to be loaded and the address of the memory 120, etc. Here, the streaming load instruction may specify one or more of the starting address and the pattern (e.g., the length, the stride, the counts, etc.) of the data to be loaded, thereby eliminating the need for one load instruction for each section/chunk of data. FIG. 2 depicts an example of a table reflecting memory layout for streaming load instruction for the data stream 190. In the example of FIG. 2, the streaming load instruction may identify a starting address of a block of data 141, wherein length of the block 141 may also be identified as, e.g., 8 bits. The stride may indicate the number of addresses to be skipped in each row, e.g. blocks 144, 145 and 147 are skipped for the row representing block 141. The count may identify the number of rows to process, e.g., counting up to three blocks down to include blocks 142 and 143. A second stride of the load instruction may identify the number of stride in a columnar fashion, e.g., indicating any rows that should be skipped (in the example of FIG. 2, block 142 may be skipped after reading 141 to move on to block 143). This process repeats itself for the entire data steam 190. As such, only one instruction is needed to load the entire data stream 190 instead of potentially thousands of instructions. A similar process may be performed for streaming sub-tasks from the instruction-streaming engine 150 to the inference engine 160.

Figure 3A:
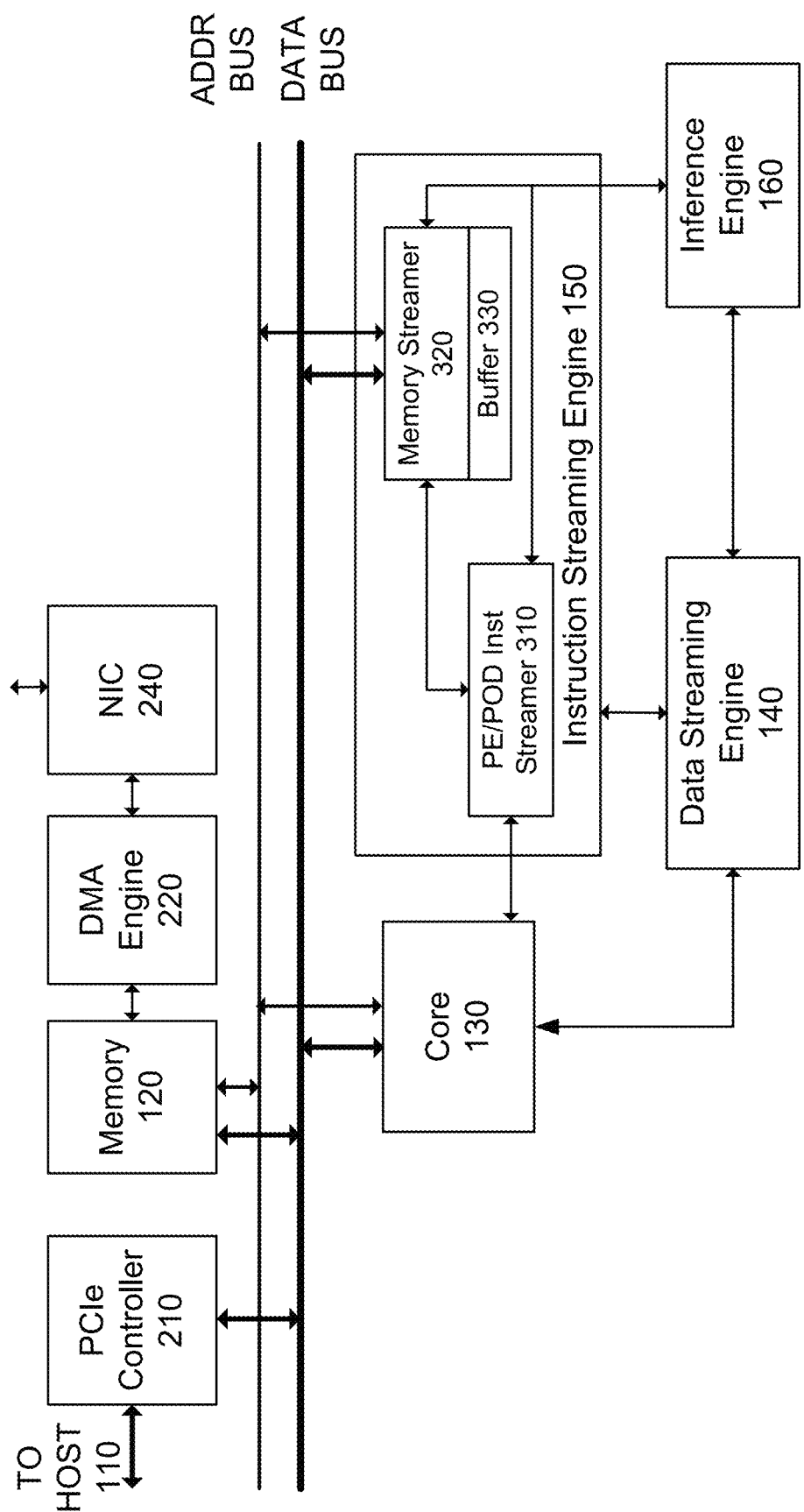
FIG. 3A-3B depict an example of a diagram of the architecture of the instruction-streaming engine according to one aspect of the present embodiments.

FIG. 3A depicts an example of a diagram of the architecture of the instruction-streaming engine 150, wherein the instruction-streaming engine 150 includes a first and second type of instruction streamer (PE/POD) unit, hereinafter referred to as machine instruction streamer 310 for streaming instructions into processing engine (PE)/POD (described later) within the inference engine 160. In other words, the machine instruction streamer 310 is configured to stream the ML commands in sub-tasks format associated with the instruction set architecture of the inference engine 160 to program the inference engine 160, e.g., processing units PE/processing pod (POD), etc. as discussed in details below. In some embodiments, the machine instruction streamer 310 is configured to communicate with the core 130 to receive the ML commands, e.g., sub-tasks. It is appreciated that to the core 130, the sub-tasks appear as data being written to a special memory location and passed via a function call, as discussed above. In some embodiments, the machine instruction streamer 310 is configured to seamlessly combine and integrate the received sub-tasks in the instruction set architecture format of the inference engine 160 for streaming thereof. In some embodiments, the instruction-streaming engine 150 may further include a memory streamer 320 and/or buffer 330 for streaming the translated programming instructions to the memory 120 and/or temporarily maintain the programming instructions before streaming them to the inference engine 160.

Figure 3B:
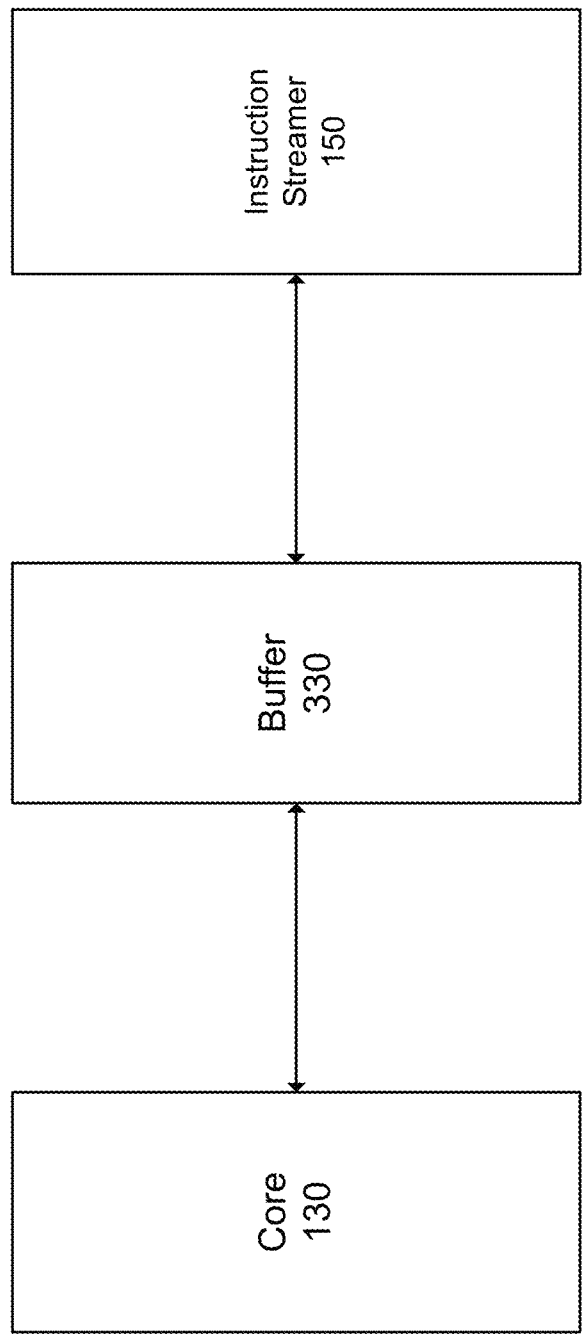

It is appreciated that transmitting the sub-tasks from the core 130 to the instruction engine 150 using non-cacheable address is very slow. Other methods may require a huge overhead. Referring now to FIG. 3B, an embodiment to efficiently and expeditiously transmitting the sub-tasks from the core 130 to the instruction streamer 150 is shown. It is appreciated that a large circular buffer 330 may be used. For example, the buffer 330 may be allocated in a DDR memory and its size may be fixed and known a-priori at compile time. In some embodiments, the buffer size may be a constant in a code being executed by the core 130 and it may be set in the instruction streamer, e.g., PE/POD instruction streamer 310, at the time of firmware download.

Two pointers may be used, one, e.g., a head pointer, by the core 130 and maintained by the core 130 while a second pointer, e.g., a tail pointer, may be used by the PE/POD instruction streamer 310 and maintained by the instruction streaming engine 150. The head pointer may point to the location where core 130 writes to the buffer 330 while a tail pointer may point to the location where the PE/POD instruction streamer 310 reads from the buffer 330. According to some embodiments, the head and tail pointers are stored in a memory mapped input/output (MMIO) space that is mapped into registers in the PE/POD instruction streamer 310.

In operation, the core 130 maintains a local copy of the head pointer and increments it each time it writes a sub-task into the buffer 330. Similarly, the PE/POD instruction streamer 310 maintains a local copy of the tail pointer and increments it each time it reads a sub-task from the buffer 330. It is appreciated that the core 130 does not read the pointer from the MMIO space because it is the only component that writes to the buffer 330 and therefore its local copy of the head pointer is the most up to date pointer. In some embodiments, the core 130 also maintains the available buffer size where it is decremented every time the core 130 writes instructions, e.g., sub-tasks, to the buffer 330. A predefined threshold may be used to identify when the buffer 330 is running low in buffer space. For example, as long as the available buffer size is greater than the threshold, the core 130 continues to write to the buffer and update the head pointer and the available buffer size, thereby eliminating the need for using non-cacheable address and large overheads. However, if the available buffer size is below the threshold the core 130 reads the MMIO of the tail pointer and resets the available buffer size. In some embodiments, the available buffer size may be set to the buffer size plus the tail pointer minus the head pointer and the result modulo to the actual buffer size. The core 130 continues writing to the buffer 330 until the available buffer size falls below the threshold.

In some embodiments, the PE/POD instruction streamer 310 compares the head pointer to the tail pointer and calculated the amount of buffer to continue to read from. For example, the amount of buffer size to read from may be calculated to be the buffer size plus the head pointer minus the tail pointer and the result modulo the actual buffer size. Thus, the PE/POD instruction streamer 310 continues reading from the buffer 330 and incrementing the tail pointer as long as the buffer size to read from is greater than zero because the head and the tail pointers are local to the PE/POD instruction streamer 310. Accordingly, sub-tasks are streamed from the core 130 to the PE/POD instruction streamer 310, efficiently, expeditiously, and with minimal overhead.

In the example of FIG. 1B, the inference engine 160 is configured to perform a ML operation on the received stream of data, e.g., to identify a subject in an image, by using the training data and executing the programming instructions received from the instruction-streaming engine 150. FIG. 4 depicts a diagram of an example of the architecture of the inference engine 160. In the example of FIG. 4, the inference engine 160 include a plurality of processing tiles, e.g., tiles 0, . . . , 63, arranged in a two-dimensional array of a plurality of rows and columns, e.g., 8 row by 8 columns. Each processing tile (e.g., tile 0) includes at least one on-chip memory (OCM) e.g., 410 (or 412, 414, 416), one POD unit, e.g., 420 (or 422, 424, 426), and one processing engine/element (PE), e.g., 430 (or 432, 434, 436). Here, the OCMs in the processing tiles are configured to receive data from the data streaming engine 140 in a streaming fashion as described, for a non-limiting example, in FIG. 2 above. The OCMs enable efficient local access to data per processing tile. The processing units, e.g., the PODs and the PEs are configured to perform highly specialized tasks, e.g., dense and sparse computations of a ML operation on the received data in the OCMs, respectively. Both the PODs and the PEs can be programmed according to the programming instructions received from the instruction-streaming engine 150. Accordingly, the data is received and processed by each processing tile as an input data stream and the result is output by each processing tile as a stream of data, thereby reducing the number of instructions required to perform the ML operation substantially. For a non-limiting example, one streaming load instruction replaces thousands of conventionally load instructions. Similarly, one streaming add instruction replaces thousands of conventionally add instructions, and one streaming store instruction replaces thousands of conventionally store instructions.

In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element 440 to form processing block 1. It is appreciated that the processing blocks may be coupled to one another in the same row or column via a plurality of routing elements. For the example as shown in FIG. 4, there are four processing blocks in each row and column of the two-dimensional array. It is further appreciated that the number and/or types of components within each processing tile, the formation of the processing blocks, the number of processing tiles in each processing block, and the number of processing blocks in each row and column of the inference engine 160 as shown in FIG. 4 are exemplary and should not be construed as limiting the scope of the embodiments. In some embodiments, the same number of PE and POD may be used for each tile, and the same number of blocks may be used in each row and column in order to provide flexibility and scalability.

In some embodiments, the OCM in each processing tile may include a number of memory blocks of any size each having one or more read and write ports (not shown). Each OCM block may further include a read queue and a write queue, which buffer the read and write requests of data stored in the OCM, respectively. In some embodiments, the OCMs of processing tiles in the same processing block support aligned-reads, wherein data allocated and maintained in these OCMs can be retrieved directly to the corresponding PODs or PEs in the tiles via at least one read port in each of the OCMs aligned with the corresponding input lanes in the PODs or PEs. Such aligned-reads minimizes data swizzles for ML operations, e.g., common matrix multiply operations, on data distributed across multiple processing tiles to reduce both the power and the latency of reading data into the PODs or PEs. Here the data to be read needs to be allocated in the OCMs is such a way that aligned-reads work, e.g., the data may be allocated by breaking down its address (X bits) into POD/PE no. (X-Y bits) and OCM address (Y bits). It is appreciated that the specific implementation discussed is for illustration purposes only and should not be construed as limiting the scope of the embodiments.

Figure 5A:
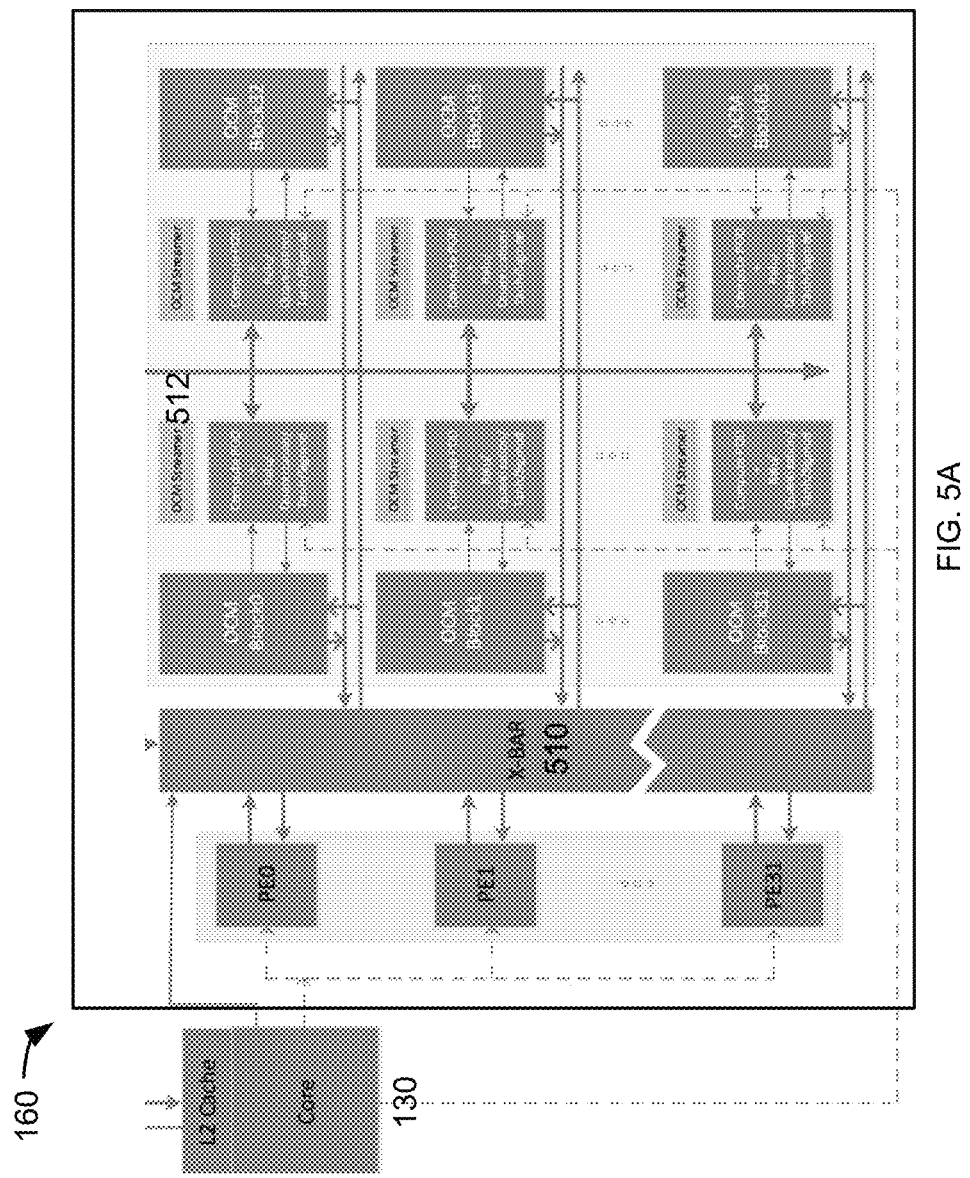
FIG. 5A-5B depict a diagram of another example of the architecture of the inference engine according to one aspect of the present embodiments.

FIG. 5A depicts a diagram of another example of the architecture of the inference engine 160, wherein the PEs are under control of the core 130 and are coupled to the OCMs and PODs via a crossbar (X-bar) 510, wherein the crossbar 510 is configured to connect the PEs to the OCMs such that any PE can read data from and/or write data to any line/row of the OCMs. It is appreciated that the number of components, the size of the components in the inference engine 160 as shown in FIG. 5A are for illustrative purposes and not intended to limit the scope of the embodiments. In some embodiments, the crossbar 510 is configured to accept one read and one write request per PE to read data from and write data to one of the OCMs, respectively. In some embodiments, the crossbar 510 is configured to route the read or write request through the array of OCMs in the inference engine 160 until the request reaches the OCM designated for the request.

In some embodiments, the crossbar 510 is configured to support merging of read and/or write requests to the exact same address in the same OCM. Specifically, if a read request reaches an OCM and finds an earlier read request to the same address is waiting at that OCM, the crossbar 510 merges the new read request with the waiting read request at the OCM and terminates the new read request. When data is read and returned for this merged read request, the data is copied n-times and sent to the n-waiting requesters for that data. When a write request matches an earlier write request to the same address at an OCM, the two write data requests are merged and the valid bits of the new write request are updated accordingly. If a read request matches a write request at an OCM, completely or partially, or vice versa, the second request is blocked until the first request is completed. If the first request is a read request, the second write request waits until the read data is returned. If the first request is a write request, the second read request waits until the data has been written by the first request before reading data from the OCM to ensure that the read request picks up the latest data at the OCM.

Figure 5B:
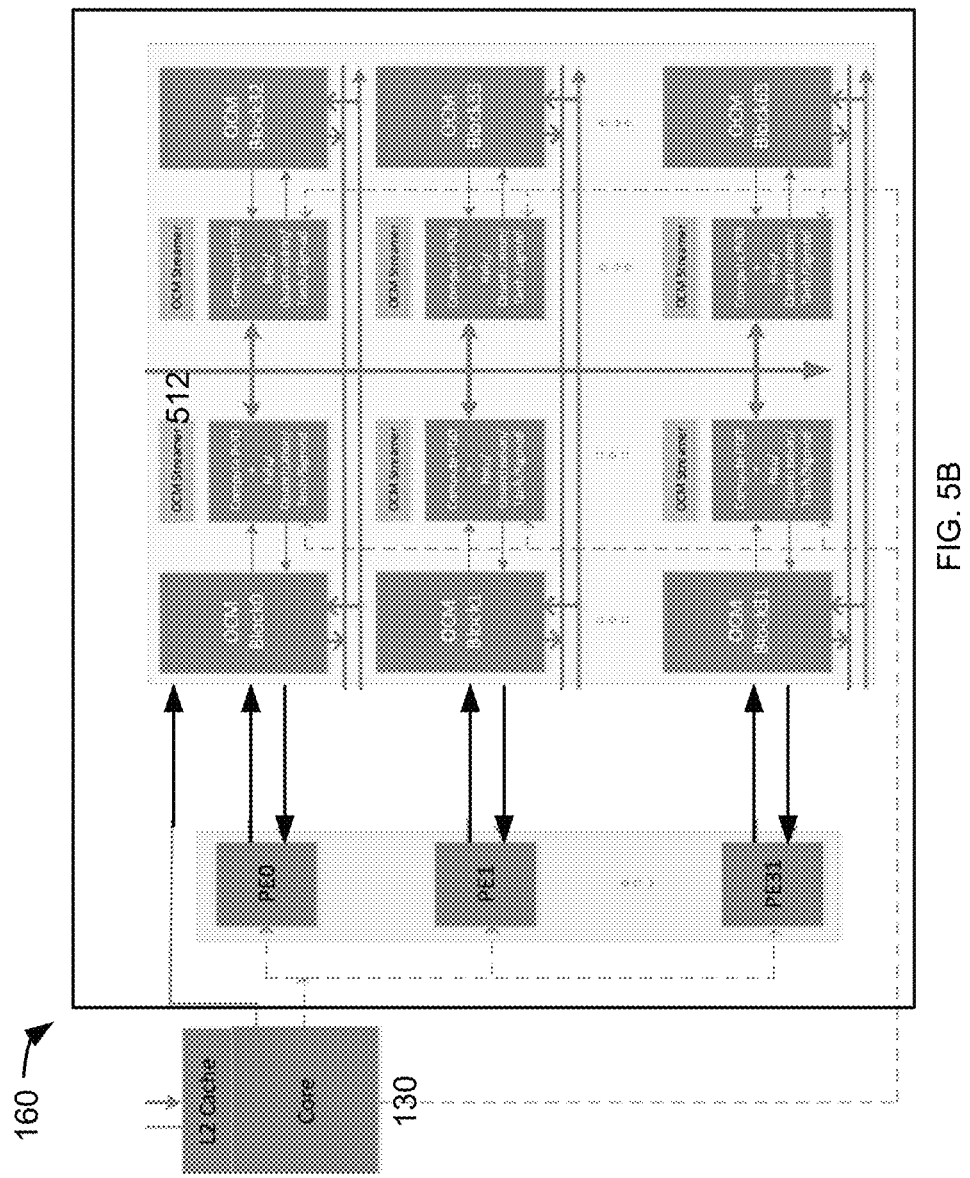

FIG. 5B depicts a diagram of another example of the architecture of the inference engine 160, wherein the PEs are under control of the core 130 and are coupled to the OCMs and PODs without the crossbar (X-bar) 510, as was shown in FIG. 5A. It is appreciated that other means may be used to connect the PEs to the OCMs. It is appreciated that the number of components, the size of the components in the inference engine 160 as shown in FIG. 5B are for illustrative purposes and not intended to limit the scope of the embodiments.

Figure 6:
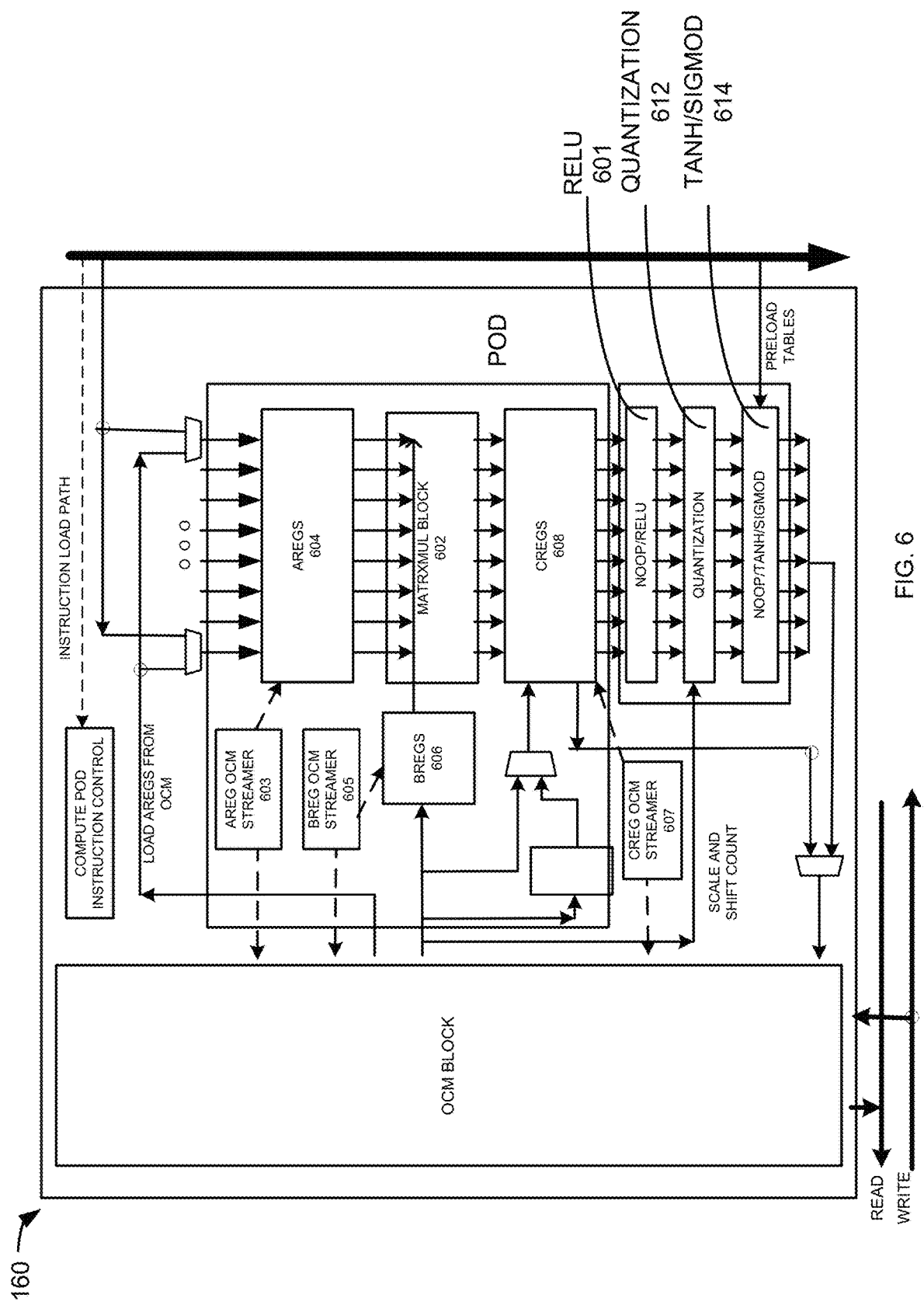
FIG. 6 depicts a diagram of an example of the architecture of the first type of processing unit according to one aspect of the present embodiments.

In the example of FIGS. 4 and 5A-5B, each POD unit in the inference engine 160 is configured to perform a dense computation task, e.g., multiplication of dense matrices, of the ML operation on the streamed data in the OCM. FIG. 6 depicts a diagram of an example of the architecture of the POD. It is appreciated that the number of components, the size of the components, and the number of bits, matrix sizes, etc. shown in FIG. 6 are for illustrative purposes and not intended to limit the scope of the embodiments. Although matrix multiplication is used as a non-limiting example in the following discussions, it is appreciated that the POD is also configured to perform other types of dense computation tasks of the ML operation. In the example of FIG. 6, a POD includes a matrix multiplication block 602, which is a two-dimensional array having X number of rows and Y number of columns, wherein each element/cell in the array has a certain number of registers (e.g., MIPS or Microprocessor without Interlocked Pipeline Stages). The matrix multiplication block 602 is configured to multiply two matrices, matrix A of X number of rows and Z number of columns and matrix B of Z number of rows and Y number of columns to generate a matrix C of X number of rows and Y number of columns.

In the example of FIG. 6, the POD further includes three types of registers—A registers 604, B registers 606, and C registers 608, which feed matrix data to the matrix multiplication block 602 for matrix multiplication. The A registers 604 include a bank of registers, e.g., m number of registers, each configured to maintain one row/column of the A matrix to be fed to the columns of the array of the matrix multiplication block 602. Each A register may have a number of entries, e.g., k elements, each with a certain number of bits wide and supporting one read or write operation per cycle. The entries allow each A register to fetch ahead next portions of the A matrix before they are needed for computation by the matrix multiplication block 602. The B registers 606 include a bank of registers, e.g., n number of registers, each configured to maintain one row/column of the B matrix to be fed to the rows of the array of the multiplication block 602. Similar to the A registers 604, each B register may have a number of entries, e.g., k elements, each with a certain number of bits wide and supporting one read or write operation per cycle. The entries allow each B register to fetch ahead next portions of the B matrix before they are needed for computation by the matrix multiplication block 602. The C registers 608 are configured to hold results of matrix-multiplication—the C matrix—produced by the multiplication block 602. The C registers 608 include a number of banks each configured to maintain one row/column of the C matrix. The C matrix is configured to have m×n elements.

During the matrix multiplication process, the matrix multiplication block 602 is configured to read elements of matrices A and B from the OCM only once (instead of reading each row or column of the matrices repeatedly) into the A and B registers, respectively, and thus saves memory access time to the OCM. Specifically, each matrix multiply operation has an inherent structure to it where a row of first matrix will multiply with all columns in second matrix and a column in second matrix will multiply with all rows in first matrix. As the matrix multiplication block 602 performs the matrix multiply operation, each row of the A registers 604 stays the same while the columns of the B registers 606 are fed into the matrix multiplication block 602 one at a time to be multiplied by the row in the A registers 604. At the same time, each column of the B registers 606 stays the same while the rows of the A registers 604 are fed into the matrix multiplication block 602 one at a time to be multiplied by the column of the B registers 606. As such, the matrix multiplication block 602 is configured to simultaneously multiply each row of the first matrix with all columns of the second matrix and each column of the second matrix with all rows of the first matrix. These outputs from these multiplications are accumulated and stored in the C registers until the matrix multiplication process is complete.

As shown in the example of FIG. 6, the A registers 604, the B registers 606, and the C registers 608 are each associated with a corresponding OCM streamer 603, 605, or 607, respectively, wherein each of the OCM streamers is programmed and configured to stream data from the OCM into the corresponding registers to ensure that matrix multiplication operation can be performed by the matrix multiplication block 602 in a streamlined fashion. Each OCM streamer has the address range of the OCM to be read and the stride to be followed for the next read, as described above. The A or B type of registers is configured to send a ready-for-next-line signal per bank to its corresponding streamer, wherein the bit pattern of the signal signifies which banks are requesting the next line of data. The corresponding streamer of the A or B registers responds to the read signal by sending the corresponding line of data from the OCM to the registers. The streamer sends a done signal to its corresponding registers when it sends the last line of data to be transmitted. When all of the banks of the registers have the lines of data, the A or B registers send a ready signal to the matrix multiplication block 602 that the next set of A or B registers are ready to be read into the matrix multiplication block 602 for matrix multiplication. In some embodiments, each register bank has a valid bit, which informs the matrix multiplication block 602 which values are valid and should be operated upon.

When the matrix multiplication is complete, e.g., when end of row for A matrix and end of column for B matrix are reached, the matrix multiplication block 602 informs the C registers 608 that all accumulations in the entries of the C registers 608 are complete and the entries are ready to be written back to the OCM via its corresponding streamer 607. Each bank of the C registers 608 will then send data to the OCM. If the OCM is not ready to accept the data from a bank of the C registers 608, the send is stalled and tried again in the next cycle, until the PE is ready to accept the data from the bank. In some embodiments, the C registers 608 are preloaded with data or are reset to zero before next set of accumulations during the next matrix multiplication operation. Such preloading allows for adding bias as part of the next matrix multiplication. In some embodiments, each PE is configured to accept, process, and write output C matrix from the matrix multiplication block 602 of the POD into the OCM.

In some embodiments, the inference engine 160 is configured to fuse/integrate these post matrix multiplication operations by each PE with the matrix multiplication operation by the corresponding POD so that these post matrix multiplication operations are performed immediately on the output from the matrix multiplication block 602 without having to transmit and save the output to the OCM first and to read the C matrix from the OCM again for these post matrix multiplication operations. By bypassing the roundtrip to the OCM, the fusion of the post matrix multiplication operations with the matrix multiplication operation saves time improves efficiency of the inference engine 160. For example, it is appreciated that in some embodiments, additional regular operations, e.g., rectified linear unit (RELU), quantization, etc., may be required on the output C matrix. Thus, a switching mechanism may be integrated within the POD architecture to determine whether additional regular operations are required and if so instead of writing the output C matrix to another memory location the output is operated on. For example, when a rectified linear operation is required the output C matrix is streamed into the RELU unit 610 configured to perform a ReLU operation on the C matrix. Similarly, when a quantization is required the output C matrix or the output of the RELU unit 610 is streamed into a quantization unit 612 configured to quantize the C matrix or a result from the RELU operations. In some embodiments, the scale, shift, and/or offset values needed for the quantization operation may be set statically by the core 130 and may be different from different ML operations. In some embodiments, these values may be part of a ML model downloaded to the core, wherein the values corresponding to the ML operation may be read from the model and written into appropriate registers before the quantization operation starts. It is appreciated that other operations, e.g., TANH, SIGMOD, NOOP, etc., may similarly be integrated within the POD to achieve further efficiencies. For example, in some embodiments, the POD may further include a tanh/sigmod unit 614 configured to perform one or more per-element operations including but not limited to tanh, sigmod, and divide operations, on the output from the matrix multiplication block 602, the RELU 601 and/or the quantization unit 612 before writing the output to the OCM. In some embodiments, the tanh/sigmod unit 614 is configured to perform the per-element operations on the output via a lookup table, wherein values of the lookup table can be preloaded into the tanh/sigmod unit 614 from the memory 120 by the core 130. The tanh/sigmod unit 614 is configured to determine a corresponding value of the operation by looking up a value x from the lookup table. Since different sections and models may be used to proximate the per-element operations based on numerical analysis, multiple lookup tables may be utilized for the per-element operations. In other words, the operation may be divided into multiple sections, where each section may be represented by a curve that is extrapolated. Thus, knowing the x value tanh may be determined by referencing the associated section and fetching the value from the table accordingly.

In the example of FIGS. 4 and 5, each PE in the inference engine 160 is configured to perform one or more sparse or irregular computation tasks of the ML operation on the streamed data in the OCM, as discussed above. Each PE is configured to read one or more lines/rows of data from the OCM, perform one or a sequence of operations on the data and write the data back to the OCM.

As presented above, PEs and PODs may be programmed, as desired. In the example of FIG. 1B and 3, the core 130 is configured to program various components, e.g., PODs and PEs, of the inference engine 160 via a set of programming instructions translated by the translocation engine 150 according to an instruction set architecture (ISA) designed for efficient data processing in the data-path. In some embodiments, the ISA is a predominantly asynchronous instruction set, wherein each instruction in the ISA programs a state-machine, which then runs asynchronously with respect to other state machines. It is appreciated that a series of instructions do not necessarily imply sequential execution. In some embodiments, the ISA provides separate synchronizing instructions to ensure order between instructions where needed.

In some embodiments, the ISA enables programming of each component, e.g., POD or PE, of the inference engine 160 in three steps: (i) programming one or more input data streams to the component to fetch input data into queues or registers associated with a computing block/operator of the component; (ii) programming the operator to perform the operations to be performed on the input data streams; and (iii) programming one or more output data streams to write the output of the operations into the OCM of the inference engine 160.

In some embodiments, the ISA includes at least three classes of programming instructions: (i) programming instructions executed by the PODs, (ii) programming instructions executed by the PEs, and (iii) common programming instructions executed before the tasks are dispatched to either the PODs or the PEs. Note that each of the programming instructions can be executed by one or more or all of the PODs and/or PEs at the same time. The following table summarizes an example of a subset of the instruction set architecture used to program the inference engine 160.

| Instruction bit assignment | Description |
|---|---|
| DDR-OCM DMA Instructions | |
| 1. DMA_DDR_to_OCM(8) ddr_addr (36), ocm_addr (22), linelen (8), linestride(14), numlines(10), blkstride(16), numblks(10), signed (1) | Programs DDR to OCM DMA. signed signifies if the values being transferred signed or unsigned. DoD sign-extends or zero-extends the 8 bit to 9 bit accordingly. FP16 values are tagged as unsigned. |
| 2. DMA_OCM_to_DDR(8) ocm_addr (22), ddr_addr (36), linlen (8), linestride(14), numlines(10), blkstride(16), numblks(10) | Programs OCM to DDR DMA. Unlike DMA_DDR_to_OCM, this instruction does not have sign bit, since 9th bit is always dropped when writing from OCM to DDR. |
| 3. DMA_DDR_Gather_to_OCM(8) ddr_ptr_arr_addr(36), OCM_addr(22), numptrs(8), linelen(8), signed (1) | Programs DDR to OCM DMA for gather |
| 4. DMA_DDR_to_Table_Tanh_Int8(8) ddr_addr(36), numbytes (10) | Copy contents of Int8 Tanh/Sigmoid table from DDR to Tile. The number of bytes need to match the number of bytes in the table - Currently 128 entries 1 byte each. The table needs to be 128B aligned. |
| 5. DMA_DDR_to_Table_Tanh_FP16 (8) ddr_addr(36), numbytes (10) | Copy contents of FP16 Tanh/Sigmoid table from DDR to Tile. The number of bytes need to match the number of bytes in the table - Exact table format TBD. |
| 6. DMA_DDR_to_Table_General_FP16(8) ddr_addr(36), numbytes (10) | Copy contents of general FP16 table from DDR to Tile. The number of bytes need to match the number of bytes in the table - Currently 128 entries, 2 bytes each. |
| Compute POD instructions - Matrix Multiply | |
| 7. PDLoadAregMM(8) addr(22), linelen(6), linestride(14), numlines(4), blkstride(14), numblks(12) | Programs OCM to Areg Streamer |
| 8. PDLoadBregMM(8) addr(22), linelen(6), linestride(14), numlines(5), blkstride(14), numblks(12) | Programs OCM to Breg Streamer |
| 9. PDDotProductMM(8) elemperline(6), numAlines(4), numBlines(5), numblks(12) | DotProduct operation in Int8/FP16. For FP16, max elemperline is 16 |
| 10. PDStoreCregMM(8) addr(22), elemperline(4), linestride(14), numlines(5), doRelu(1), doTanhSigmoid(2) | Write Creg to OCM. Based on int or FP, requantize to Int9 or clip to FP16. Optionally do Relu, Tanh, Sigmoid before writing. |
| 11. PDStoreCregMMRaw(8) addr(22), elemperline(4), linestride(14), numlines(5) | Write raw Creg (32 b per element) to OCM |
| 12. PDLoadCregMM(8) addr(22), elemperline(4), linestride(14), numlines(5) | Writes Creg (32 b per element) from OCM |
| 13. PDLoadBiasMM(8) addr(22), numelem(4), reset (1) | Loads Bias into Bias buffer. Bias is 32 b (both for Int8 and FP16) |
| 14. PDBcstBiastoCregMM(8) numelem(4), bcstlen (5) | Broadcast Bias into Creg |
| Compute POD instructions - Element-wise Operations | |
| 15. PDLoadStreamA(8) addr(22), linelen(6), linestride(14), numlines(10), blkstride(14), numblks(12) | Program generic load streamer from OCM. Feeds into an ALU unit |
| 16. PDLoadStreamB(8) addr(22), linelen(6), linestride(14), numlines(10), blkstride(14), numblks(12) | Program generic load streamer from OCM. Feeds into an ALU unit |
| 17. PDMult(8) elemperline(6), numlines(22) | Elementwise Mult (Int8/FP16). FP16: max elemperline is 16. |
| 18. PDAdd(8) elemperline(6), numlines(22) | Elementwise Add (Int8/FP16). FP16: max elemperline is 16. |

| Instruction bit assignment | Description |
|---|---|
| 19. PDMoveB(8) elemperline(6), numlines(22) | Move lines from load stream B buffer to store stream buffer |
| 20. PDStoreStream(8) addr(22), elemperline(6), linestride(14), numlines(10), blkstride(14), numblks(12), doRelu(1), doTanhSigmoid(2), bcstall(1), useTileRange(1), relTileSt(8), reTileEnd(8) | Programs generic Int8 store streamer into OCM. Reads output of an ALU. Quantizes (Int8) or clips (Fp16) on writeback. Performs Relu and Tanh/sigmoid optionally. If bcstall is set then broadcasts to all tiles. If use TileRange is set then broadcasts to other tiles in range specified by relTileSt and relTileEnd. Tile range is relative. |
| 21. PDSync (8) | Sync instruction within task. Instruction after PDSync will execute after all instructions before PDSync are executed in the same Task |
| PE instructions | |
| 22. PELoadStream1(8) addr(22), linelen(4), linestride(14), numlines(10), blkstride(14), numblks (12) | Programs streamer1 to read from OCM. |
| 23. PELoadStream2(8) addr(22), linelen(4), linestride(14), numlines(10), blkstride (14), numblks (12) | Programs streamer2 to read from OCM. |
| 24. PEStoreStream(8) addr(22), linelen(4), linestride(14), numlines (10), blkstride(14), numblks (12), bcstall(1), useTileRange(1), relTileSt(8), relTileEnd(8) | Programs streamer to write to OCM. If bcstall is set then broadcasts to all tiles. If use TileRange is set then broadcasts to other tiles in range specified by relTileSt and relTileEnd. Tile range is relative. |
| 25. PEMove(8) dest (5), src (5), elemperline(4), extend(1), int8orFP16(1), stblk(1), endblk(1), rptcnt(22) | Moves from src to dest. This is the only instruction that can read ReadQ and/or write writeQ. All other instructions will only work register to register. Src = 0x1E and 0x1F are ReadQ1 and ReadQ2. Rest are registers. Dest = 0x1F is WriteQ. Max elemperline for FP16 is 8. The stblk and endblk specify if this instruction is start and/or end of an ALUblock. The block is repeated rptcnt times. The rptcnt should be such that the number of ReadQ1/2 reads and WriteQ writes match the corresponding writes from LoadStreamers and reads from StoreStreamer, respectively. The rptcnt is only valid if stblk = 1. When the bit extend is 0 then the numbers are transferred as is from ReadQ to Register to WriteQ (int9->int9 or FP16->FP16). When the bit extend is 1 then the numbers are extended before writing (int9 sign-extended to in32; FP16 converted to F32). When extend is 1, the dest can only be a register. Int8orFP16 bit specifies if the instruction is Integer or FP. |
| 26. PEMoveOp(8) dest (5), src (5), elemperline(4), opmask(5), cond (1), int8orFP16(1), stblk(1), endblk(1), rptcnt(22) | Moves from src to dest. Opmask specifies the unary operation to be performed |

| Instruction bit assignment | Description |
| --- | --- |
| | before the move: none/Tanh/ Sigmoid/Quantization/ Normalization/etc. This instruction is only register to register, so Src cannot be 0x1E or 0x1F and Dest cannot be 0x1F. Max elemperline for FP16 is 8. The cond bit indicates if the instruction is conditional. It cond is 1 then the instruction uses the element-wise conditional bits in Conditional register to decide which elements are operated on and which are skipped. For elements that are skipped, a 0 is written in the dest. The stblk and endblk specify if this instruction is start and/or end of an ALUblock. The block is repeated rptcnt times. The rptcnt is only valid if stblk = 1. Int8orFP16 bit specifies if the instruction is Integer or FP. |
| 27. PEAdd(8) dest (5), src1 (5), src2 (5), elemperline(4), cond(1), int8orFP16(1), stblk(1), endblk(1), rptcnt(22) | Adds src1 and src2 and writes dest. Max elemperline for FP16 is 8. The cond bit indicates if the instruction is conditional. It cond is 1 then the instruction uses the element-wise conditional bits in Conditional register to decide which elements are operated on and which are skipped. For elements that are skipped, a 0 is written in the dest. The stblk and endblk specify if this instruction is start and/or end of an ALUblock. The block is repeated rptcnt times. The rptcnt is only valid if stblk = 1. Int8orFP16 bit specifies if the instruction is Integer or FP. |
| 28. PESub(8) dest (5), src1 (5), src2 (5), elemperline(4), cond(1), int8orFP16(1), stblk(1), endblk(1), rptcnt(22) | Same as Add, except does substract |
| 29. PEMul(8) dest (5), src1 (5), src2 (5), elemperline(4), cond(1), int8orFP16(1), stblk(1), endblk(1), rptcnt(22) | Same as Add, except does multiply |
| 30. PEAnd(8) dest(5), src1(5), src2(5), elemperline(4), cond(1), stblk(1), endblk(1), rptcnt(22) | Bitwise AND of src1 and src2. Integer or FP agnostic - works on bits. |
| 31. PEOr(8) dest(5), src1(5), src2(5), elemperline(4), cond(1), stblk(1), endblk(1), rptcnt(22) | Bitwise OR of src1 and src2. Integer or FP agnostic - works on bits. |
| 32. PENot(8) dest(5), src(5), elemperline(4), cond(1), stblk(1), endblk(1), rptcnt(22) | Bitwise NOT of src. Integer or FP agnostic - works on bits. |
| 33. PEShl(8) dest(5), src(5), shftcnt(5), elemperline(4), cond(1), stblk(1), endblk(1), rptcnt(22) | Shift left Src1 by shftcnt. The instruction performs a bit-wise shift, without regard to whether the number is Int9 or FP16. The shift is contained within the element. The bits do not shift from one element into another. |
| 34. PEShr(8) dest(5), src(5), shftcnt(5), elemperline(4), cond(1), stblk(1), endblk(1), rptcnt(22) | Same as PEShl, except shift right |
| 35 PEShufL(8) dest(5), src(5), shufcnt(2), elementperline(4), cond(1), stblk(1), endblk(1), rptcnt(22) | Shuffle elements of Src up to 4 elements to the left. |

| Instruction bit assignment | Description |
| --- | --- |
| | This instruction moves entire element. The condition determines which source elements participate in the operation. The src elements with cond bit = 0 are set to zero. |
| 36 PEShufR(8) dest(5), src(5), shufcnt(2), elementperline(4), cond (1), stblk(1), endblk(1), rptcnt(22) | Same as PEShufL, except shuffling to right. |
| 37. PEMax(8) dest(5), src1 (5), src2 (5), elemperline(4), cond(1), int8orFP16(1), stblk(1), endblk(1), rptcnt(22) | Does elementwise Max between src1 and src2 and writes the dest. Int8orFP16 specifies whether instruction is integer or FP. |
| 38. PEMaxReduce(8) dest(5), src (5), elemperline(4), cond(1), Int8orFP16(1), stblk(1), endblk(1), rptcnt(22) | Does Max operations on all the elements in src and writes the dest. The condition applies to which input elements participate in the operation. The output always written in the element 0 (even if the corresponding cond bit is 0) |
| 39. PEMin(8) dest(5), src1 (5), src2 (5) elemperline(4), cond(1), int8orFP16(1), stblk(1), endblk(1), rptcnt(22) | Does elementwise Min between dest and src and writes the dest. |
| 40. PEMinReduce(8) dest(5), src (5), elemperline(4), cond(1), int8orFP16(1), stblk(1), endblk(1), rptcnt(22) | Does Min operations on all the elements in src and writes the dest. The condition applies to which input elements participate in the operation. The output always written in the element 0 (even if the corresponding cond bit is 0) |
| 41. PEAddReduce(8) dest(5), src (5), elemperline(4), cond(1), int8orFP16(1), stblk(1), endblk(1), rptcnt(22) | Adds all elements of src and writes into dest. The condition applies to which input elements participate in the operation. The output always written in the element 0 (even if the corresponding cond bit is 0) |
| 42. PEDivideFP16(8) dest(5), src1(5), src2 (5), elemperline(4), cond(1), stblk(1), endblk(1), rptcnt(22) | Does src1/src2 and writes the dest. FP16. Not available for Int9. |
| 43. PELoadRegImm(8) dest(5), Imm(32), elemperline(4), cond(1), stblk(1), endblk(1), rptcnt(22) | Load values in a register. Imm values are 32 b for both Int and FP. |
| 44. PEEq(8) src1(5), src2(5), elemperline(4), int8orFp16(1), stblk(1), endblk(1), rptcnt(22) | Performance element-wise equality comparison of src1 and src2 and sets the condition register. A bit in condition register is 1 if corresponding element comparison is true, else it is 0 |
| 45. PELt(8) src1(5), src2(5), elemperline(4), int8orFP16(1), stblk(1), endblk(1), rptcnt(22) | Performance element-wise less than comparison of src1 and src2 and sets the condition register. A bit in condition register is 1 if corresponding element comparison is true, else it is 0 |
| 46. PENotCond(8) stblk(1), endblk(1), rptcnt(22) | Inverses the condition register |
| 47. PESaveCond(8) dest(5), stblk(1), endblk(1), rptcnt(22) | Saves the condition register in dest |
| 48. PERestoreCond(8) src(5), stblk(1), endblk(1), rptcnt(22) | Restores the condition register from src |
| 49. PESync (8) | Sync instruction within task. Instruction after PESync will execute after all instructions before PESync are executed in the same Task |

-continued

| Instruction bit assignment | Description |
| --- | --- |
| PE/POD/DoD Common instructions | |
| 50. Loop(8) numinst(5), arglid(8), arglinc(16), arg2id(8), arg2inc(16), arg3id(8), arg3inc(16), loopcnt(22) | Allows grouping next numinst instructions into a group that is iterated over. Up to three arguments in the instructions being looped can be incremented per iteration based on the corresponding increment count. argid format (8 bits) - inst num (5 bits): argtype (3 bits). argtype can be: 000—no arg; 001—ddr addr; 010—ocm addr; 011—destreg; 1xx—reserved, if argtype is destreg then the corresponding arginc can only be 1. |
| 51. TileLoadQuantScaleConsts (8) Rscale (32), Rshift (6), Dscale (16), QscaleR(16) | Loads the constants needed for Requantization (Rscale and Rshift), Dequantization (Dscale) and Quantization (QscaleR). QscaleR is reciprocal and will be multiplied with the source number. Rscale and Rshift are Integer values and are used both in PE or POD. Dscale and QscaleR are FP16 values. When used to provide Rscale values for the element-wise operations, the Rscale should be within 18 bits or +/-2^17 int number. |
| Instruction Streamer Instructions | |
| 52. PodTaskBcst(8) numinst(5), Int8orFP16(1), tilemask(64), syncbits(2), set_tag(5), ins_sync_tag(5), startTilePerfCnt (1), endTilePerfCnt(1), startDODPerfCnt (1), endDODPerfCnt(1) | Allows grouping instructions into task that is then broadcasted to a collection of Pods as specified by the Tilemask. syncbits can be 00—NoSync, 01—localSync, 10—Global Sync, 11—Inst Sync. Int8orFP16 specifies if the operations in the POD task are to be performed in Int8 or FP16 format |
| 53. PETaskBcst(8) numinst(5), tilemask(64), syncbits(2), set_tag(5), ins_sync_tag(5), startTilePerfCnt (1), endTilePerfCnt(1), startDODPerfCnt (1), endDODPerfCnt(1) | Same as PodTaskBcst, except (i) the broadcast is to the PEs and (ii) there is no Int8orFP16 bit. Both Int8 and FP16 instructions can be mixed in a PE task |
| 54. DMATaskBcst(8) numinst(3), tilemask(64), syncbits(2), set_tag(5), ins_sync_tag(5), startTilePerfCnt (1), endTilePerfCnt(1), startDODPerfCnt (1), endDODPerfCnt(1) | Allows grouping DMA instructions into task for the DoD. It can have only one type of DMA instructions at a time: DDRtoOCM, OCMtoDDR, DDRtoOCMgather. It cannot mix the instruction. For DDRtoOCM and DDRtoOCMgather, the tilemask specifies the tiles that will receive the DMA data. For OCMtoDDR, the tilemask can only have 1 bit set at a time. |
| 55. ResetTiles(8) tilemask(64) | Reset all pointers and synchronization state in the Tiles specified by the tilemask. OCM content are not impacted. |

-continued

| Instruction bit assignment | Description |
| --- | --- |
| 56. ResetDOD(8) | Reset pointers in both the DoD |
| 57. INSSync (8) set_tag(5), ins_sync_tag(5) | Global sync instruction enforced at instruction streamer. Instruction after INS_Sync will execute after all instructions before INS_Sync are executed. |

In some embodiments, the programming instructions executed by one or more PODs are configured to perform one or more of: loading data from memory 120 to the A registers 604, loading data from the OCM to the A registers 604, loading data from the OCM to the B registers 606, performing matrix multiplication by the matrix multiplication block 602, storing result from the C registers 608 to the OCM without post processing (e.g., ReLU, quantization, tanh, and/or sigmod), storing result from the C registers 608 to the OCM after post processing (e.g., ReLU, quantization, tanh, and/or sigmod), load bias, scale, and/or shift values, and loading the lookup tables for tanh and/or sigmod operations from the A registers 604. In some embodiments, the data loading instructions are stalled when the registers and/or buffers are full and will resume when there is space to accommodate the data.

Figure 7:
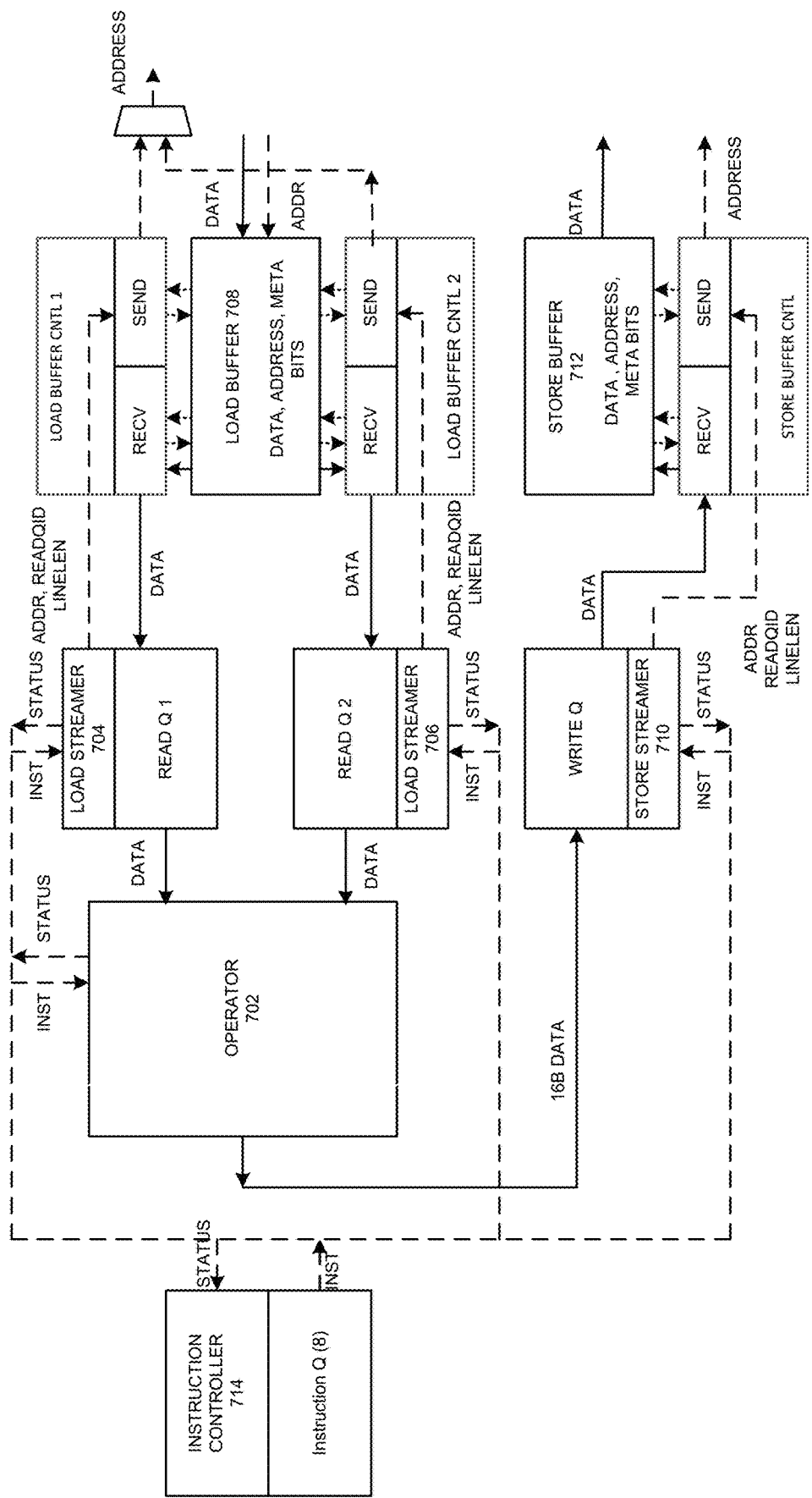
FIG. 7 depicts a diagram of an example of the architecture of the second type of processing unit according to one aspect of the present embodiments.

FIG. 7 depicts a diagram of an example of the architecture of the PE. In some embodiments, the programming instructions executed by one or more PEs are configured to perform one or more of: programming one or more load streamers 704 and/or 706 to stream data from the OCM, moving data from the read queues to the write queues with or without performing one or more of quantization, tanh, and/or sigmod on the data, programming the operator 702 to perform one or more of adding, averaging, multiplying, summing, dividing, and finding maximum value operations on the input data streams, programming the operator 702 to output result to the write queue with or without performing one or more of quantization, tanh, and/or sigmod on the result, and programming one or more store streamers 710 to write data from the write queue to the OCM.

In some embodiments, the programming instructions executed by one or more PEs are configured to perform a set of operations listed above to set one or more of one or more input data streams, an output data stream, and the set of operations to be performed by the PE. As shown in the example of FIG. 7, the programming instructions set by the core 130 can be stored in an instruction controller 714. An operator 702 is configured to perform the various post matrix multiplication operations, including but not limited to one or more of, Max—getting the maximum value out of all the elements in the data stream, Avg—getting the average value of all the elements in the data stream, Add—adding corresponding elements of two input data streams (e.g., lines having the same number of elements), Mul—multiplying corresponding elements of two input data streams, Reshape—rewriting the input data stream in a different pattern for matrix transformations, non-linear operations, e.g., Tanh, Sigmoid, spatial Batch Normalization (SpatialBN), Local response normalization (LRN) etc. The PE further includes one or more load streamers 704 and 706 configured to read and load one or more streams of input data from a load buffer 708 into a plurality of read queues as input to the operator 702. In some embodiments, each input stream is specified in format of starting address, number of lines to read for the operation, line-stride between lines, line width—how many bytes per line, stride to next block, and number of blocks to read. The PE further includes a store streamer 710 configured to transmit a stream of output data from the operator 702 to a store buffer 712 and then to the OCM. In some embodiments, the output stream is specified in the format of starting address, number of lines to writes, line-stride between lines, line-width, stride to next block. After the PE has been run autonomously until the input stream is exhausted, at which point is it ready to be programmed for the next job.

In some embodiments, the common programming instructions executed by one or more the PODs and/or the PEs are configured to allow grouping of a set of instructions into one or more tasks and broadcast the tasks to each of the PODs and/or the PEs. In some embodiments, the common programming instructions executed by one or more the PODs and/or the PEs are configured to allow each of the PODs and/or the PEs to iteratively execute the grouped set of instructions for the tasks in a loop until certain termination conditions are met.

For a neural network such as a convolution neural network (CNN), weights for matrix multiplications can be more than 85% zeros when trained with the intent to increase sparsity. Even without special training, the sparsity in weights is around 60-70%. As such, a huge performance and power improvement may be achieved by exploiting such sparsity. In the example of FIG. 1B, the core 130 is configured to explore sparsity of data being processed for the ML operations, e.g., matrix multiplications, in both weights and activation. As discussed below, there are three levels at which the core 130 can take advantage of sparsity—power reduction, bandwidth amplification, and computing time reduction.

In some embodiments, the core 130 is configured to explore sparsity of data to achieve power reduction. Since the zero values in the data naturally reduce toggle in the logic during the ML operation, identifying the sparsity or zero values in the data leads to power reduction. In some embodiments, the core 130 is configured to adopt an elaborative clock gating schemes based on the sparsity of the data to reduce the number of clock cycles, and thus power consumptions by hardware-based programmable architecture 100 during the ML operation.

In some embodiments, the core 130 is configured to explore sparsity of data to amplify bandwidths of the memory 120 and/or the OCMs. Specifically, by storing weights and activation (input data) in compressed form in memory 120 and/or OCM, the core 130 is configured to amplify the effective bandwidth of the memory 120 and/or OCM by reading out more useful data per access compared to the baseline. In some embodiments, the core 130 data may be decompressed before it is fed into the compute engine, if bandwidth amplification is desired.

In some embodiments, the core 130 is configured to explore sparsity of data to reduce computing time by directly feeding the input data in compressed form into the computing logic or processors in PODs and/or PEs of the inference engine 160. Feeding compressed data into the processors allows the same hardware to perform computation on more data in one clock cycle, thereby reducing the amount of time needed to finish the overall computation for the ML operations.

Figure 8:
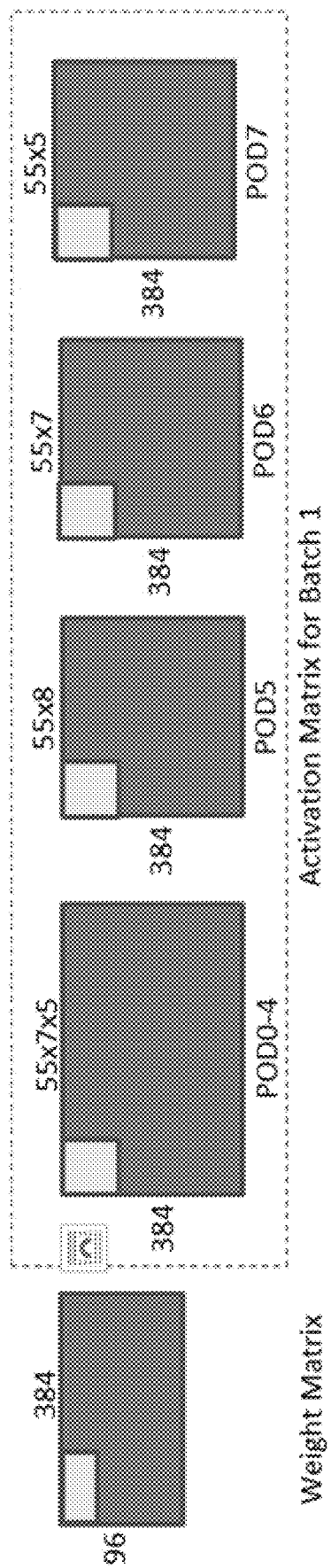
FIG. 8 depicts an example of a diagram to illustrate convolution and ReLU operations according to one aspect of the present embodiments.

In some embodiments, the core 130 is configured to format and represent sparse data in compressed form/format in one or more of, for non-limiting examples, compressed sparse row (CSR), compressed sparse column (CSC), run length encoding (RLE), etc. In the example of the CSR format, a sparse row is represented as two arrays of same size, one containing all the non-zero values and other containing the column ids of the corresponding values in the first array. CSC is same as CSR except that the compression is done column-wise format for representing sparse data. RLE compresses the sparse vectors by removing all zeros and instead recording the number of zeros between each FIG. 8 depicts an example of a diagram to illustrate convolution and ReLU operations. In the example, the weight matrix in the memory 120 is 96×3×11×11 in dimension, which is the same as 96×363 in two dimensions. As such, the weight matrix may be padded to make it a multiple of 64 so that it can be read efficiently into the POD. The padded weight matrix is 96×384. This is multiplied with the padded activation matrix 384×(55×55×8) that is present in OCM, distributed among the 64 PODs. In some embodiments, at most 8×64 weights are operated on at a time. These weights multiply with 1×64 activation per POD per cycle, giving a total of 64×64 activations per cycle that get multiplied across all 64 PODs. In some embodiments, one can multiply up to 32 1×64 activations per POD, over 32 cycles, with the same set of 8×64 weights. The corresponding results may be stored in 32 separate accumulators. Therefore, across 64 PODs, same set of weights can operate over 64×2048 activation before new sets of weights are brought in to the POD or the accumulator values that are saved away in the OCM.

In some embodiments, the core 130 is configured to utilize a higher level function to break down the larger matrix multiplication into sub-matrix multiplications that fit into each function call. This higher level function will run on the core and will set all the arguments for the function calls based on the matrix sizes involved in the larger matrix multiplications. The function call stores the results of the matrix multiply, which are in C registers 608, back into OCM. Relu or Tanh or Sigmoid may be performed on each element before writing to the OCM at the end of convolution and Relu operations.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. An array-based inference engine configured to perform a machine learning (ML) operation on an input data stream, comprising:
    a plurality of processing tiles arranged in a two-dimensional array of a plurality of rows and a plurality of columns, wherein each processing tile of the plurality of processing tiles comprises at least one or more of
        an on-chip memory (OCM) configured to
            load and maintain data from the input data stream for local access by components in the each processing tile;
            maintain and output result of the ML operation performed by the each processing tile as an output data stream;
        a first processing unit (POD) configured to perform a dense and/or regular computation task of the ML operation on the data in the OCM; and
        a second processing unit/element (PE) configured to perform a sparse and/or irregular computation task of the ML operation on the data in the OCM and/or from the POD,
    the plurality of processing tiles are organized into a plurality of processing blocks, and wherein the OCMs of the plurality of processing tiles in the same processing block are configured to support aligned-reads, wherein data allocated and maintained in the OCMs are retrieved directly by the corresponding PODs and/or PEs in the processing tiles via at least one read port in each of the OCMs.

2. The system of claim 1, wherein:
the input data stream includes data to be analyzed and inferred by the inference engine and/or training data used to train the inference engine for the ML operation, wherein the training data includes a polynomial weights associated therewith.

3. The system of claim 1, wherein:
the inference engine is configured to perform only performance-critical operations of the ML operation.

4. The system of claim 1, wherein:
each processing tile is programmable by a set of programming instructions streamed to the inference engine.

5. The system of claim 4, wherein:
the set of programming instructions is configured to program the POD and/or the PE in the processing tile to perform one or more of: loading the data into the POD and/or PE, performing the operations on the data by the POD and/or PE, and writing output of the operations into the associated OCM of the processing tile.

6. The system of claim 5, wherein:
each processing tile is programmed to load, process, and output the input data stream and/or the output data stream via one streaming instruction.

7. The system of claim 1, wherein:
each processing block includes a set of the processing tiles coupled to one another via a routing element, wherein the processing blocks in the same row or column are coupled to one another via one or more routing elements.

8. The system of claim 1, wherein:
the POD in each processing tile is configured to perform a matrix multiplication operation on the data in the OCM of the processing tile.

9. The system of claim 8, wherein:
the PE in each processing tile is configured to perform one or more post matrix multiplication operation on output from the matrix multiplication operation by the POD in the same processing tile.

10. The system of claim 8, wherein:
the inference engine is configured to integrate one or more post matrix multiplication operations with the matrix multiplication operation by the POD in each processing tile so that the one or more post matrix multiplication operations are performed immediately on the output from the matrix multiplication by the POD without having to transmit and save the output to the OCM first and to read from the OCM again for these post matrix multiplication operations.

11. A method to support perform a machine learning (ML) operation on an input data stream via an inference engine, comprising:
organizing a plurality of processing tiles into a plurality of processing blocks;
loading and maintaining data from the input data stream for local access by an on-chip memory (OCM) of one of a plurality of processing tiles arranged in a two-dimensional array of a plurality of rows and a plurality of columns in the inference engine;
performing a dense and/or regular computation task of the ML operation on the data in the OCM via a first processing unit (POD) in the processing tile;
performing a sparse and/or irregular computation task of the ML operation on the data in the OCM and/or from the POD via a second processing unit/element (PE) in the processing tile;
maintaining and outputting result of the ML operation performed by the processing tile as an output data stream from the OCM; and
supporting aligned-reads by the OCMs of the processing tiles in the same processing block, wherein data allocated and maintained in the OCMs are retrieved directly to the corresponding PODs and/or PEs in the processing tiles via at least one read port in each of the OCMs.

12. The method of claim 11, further comprising:
including in the input data stream data to be analyzed and inferred by the inference engine and/or training data used to train the inference engine for the ML operation, wherein the training data includes a polynomial with their respective weights.

13. The method of claim 11, further comprising:
performing only performance-critical operations of the ML operation by the inference engine.

14. The method of claim 11, further comprising:
programming the POD and/or the PE in the processing tile via a set of programming instructions to perform one or more of: loading the data into the POD and/or PE, performing the operations on the data by the POD and/or PE, and writing output of the operations into the OCM of the processing tile.

15. The method of claim 14, further comprising:
programming each processing tile to load, process, and output the input data stream and/or the output data stream via one streaming instruction.

16. The method of claim 11, further comprising:
organizing the plurality of processing tiles in each processing block to be coupled to one another via a routing element, wherein the processing blocks in the same row or column are coupled to one another via one or more routing elements.

17. The method of claim 11, further comprising:
performing a matrix multiplication operation on the data in the OCM of the processing tile via the POD in the processing tile.

18. The method of claim 17, further comprising:
performing one or more post matrix multiplication operation on output from the matrix multiplication operation by the POD in the processing tile via the PE in the same processing tile.

19. The method of claim 17, further comprising:
integrating one or more post matrix multiplication operations with the matrix multiplication operation by the POD in each processing tile so that the one or more post matrix multiplication operations are performed immediately on the output from the matrix multiplication by the POD without having to transmit and save the output to the OCM first and to read from the OCM again for these post matrix multiplication operations.

* * * * *